(12) United States Patent
Davis et al.

(10) Patent No.: US 12,015,922 B2
(45) Date of Patent: Jun. 18, 2024

(54) AUTOMATED REMOTE ID MONITORING NETWORK

(71) Applicant: Apple Inc., Cupertino, CA (US)

(72) Inventors: Mark Edward Davis, San Diego, CA (US); Gabriel C. Cox, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 17/437,468

(22) PCT Filed: Mar. 13, 2020

(86) PCT No.: PCT/US2020/022691
§ 371 (c)(1),
(2) Date: Sep. 9, 2021

(87) PCT Pub. No.: WO2021/002895
PCT Pub. Date: Jan. 7, 2021

(65) Prior Publication Data
US 2022/0191698 A1   Jun. 16, 2022

Related U.S. Application Data

(60) Provisional application No. 62/818,526, filed on Mar. 14, 2019.

(51) Int. Cl.
*H04W 12/104* (2021.01)
*H04W 4/021* (2018.01)
(Continued)

(52) U.S. Cl.
CPC ......... *H04W 12/104* (2021.01); *H04W 4/021* (2013.01); *H04W 12/03* (2021.01);
(Continued)

(58) Field of Classification Search
CPC .......... H04W 12/104; H04W 12/0431; H04W 12/03; H04W 4/021; H04W 12/06; H04W 84/06
(Continued)

(56) References Cited

U.S. PATENT DOCUMENTS 9,310,477 B1 * 4/2016 Sampigethaya ..... G08G 5/0091
10,074,284 B1 * 9/2018 Priest .................... H04W 4/021
(Continued)

FOREIGN PATENT DOCUMENTS

EP          3349085        7/2018
WO    WO 2017/177361     10/2017

OTHER PUBLICATIONS

PCT International Preliminary Report on Patentability in International Appln. No. PCT/US2020/022691, dated Aug. 25, 2021, 13 pages.
(Continued)

*Primary Examiner* — Thanh T Le
(74) *Attorney, Agent, or Firm* — Fish & Richardson P.C.

(57) ABSTRACT

Techniques and systems are described for monitoring remote identifiers transmitted by aerial devices and for detecting whether an aerial device is engaging in suspicious activities. A described technique can include determining, based on information collected from one or mom network components associated with a cellular network, that an aerial device is communicating via the cellular network and is operating in a geographical area; determining whether the aerial device corresponds to a remote identifier which is transmitted within the geographical area or reported for the geographical area; and providing an alarm notification based on the aerial device lacking a correspondence to a remote identifier which is transmitted within the geographical area or reported for the geographical area.

18 Claims, 15 Drawing Sheets

(51) Int. Cl.
*H04W 12/03* (2021.01)
*H04W 12/0431* (2021.01)
*H04W 12/06* (2021.01)
*H04W 84/06* (2009.01)

(52) U.S. Cl.
CPC ....... *H04W 12/0431* (2021.01); *H04W 12/06* (2013.01); *H04W 84/06* (2013.01)

(58) Field of Classification Search
USPC .......................................... 726/26
See application file for complete search history.

(56) References Cited

U.S. PATENT DOCUMENTS

| | | | | |
|---|---|---|---|---|
| 10,217,002 | B2* | 2/2019 | Chan | B64U 10/14 |
| 2017/0092138 | A1* | 3/2017 | Trundle | B64C 39/024 |
| 2017/0094527 | A1 | 3/2017 | Shattil et al. | |
| 2017/0148332 | A1* | 5/2017 | Ziemba | H04B 1/713 |
| 2018/0046180 | A1* | 2/2018 | Falk | G05D 1/0022 |
| 2018/0081355 | A1* | 3/2018 | Magy | H04K 3/65 |
| 2020/0008059 | A1* | 1/2020 | Fox | H04W 12/06 |
| 2020/0043346 | A1* | 2/2020 | Vacek | G08G 5/0026 |
| 2020/0187151 | A1* | 6/2020 | Wang | H04W 36/0058 |
| 2021/0092604 | A1* | 3/2021 | Fox | H04W 12/08 |
| 2021/0120521 | A1* | 4/2021 | Bin Redhwan | H04W 64/006 |
| 2021/0144671 | A1* | 5/2021 | Matsuki | G08G 5/0082 |
| 2021/0399790 | A1* | 12/2021 | Morozs | H04B 7/024 |
| 2022/0240194 | A1* | 7/2022 | Lee | H04W 52/242 |

OTHER PUBLICATIONS

PCT International Search Report and Written Opinion in International Appln. No. PCT/US2020/022691, dated Mar. 22, 2021, 19 pages.

\* cited by examiner

AUTOMATED REMOTE ID MONITORING NETWORK

CROSS REFERENCE TO RELATED APPLICATION

This disclosure claims the benefit of the priority of U.S. Provisional Patent Application No. 62/818,526, entitled "Automated Remote ID Monitoring Network" and filed on Mar. 14, 2019. The above-identified application is incorporated herein by reference in its entirety.

TECHNICAL FIELD

This disclosure relates generally to aerial devices and wireless networks, such as cellular networks.

BACKGROUND

Aerial devices can receive command and control (C2) information from an operator over one or more radio frequencies (RF) and operate in accordance with the received C2 information. Further, an aerial device such as an Unmanned Aircraft System (UAS) or Unmanned Aerial Vehicle (UAV) can operate in national airspace together with conventional aircraft. A UAS Traffic Management (UTM) system is being developed to manage traffic of such devices. An Air Navigation Service Provider (ANSP) such as the Federal Aviation Administration (FAA) in the United States provides air traffic management (ATM) services for operations within the National Airspace System (NAS). A UTM system can include a Flight Information Management System (FIMS) which is operated by the ANSP and interfaces with the NAS. The FIMS can interface with a UAS Service Supplier (USS). The USS can be configured to provide traffic management services for aerial devices.

SUMMARY

Techniques and systems are described for monitoring remote identifiers transmitted by aerial devices and for detecting whether an aerial device is engaging in suspicious or noncompliant activities. A described technique includes determining, based on information collected from one or more network components associated with a cellular network, that an aerial device is communicating via the cellular network and is operating in a geographical area; determining whether the aerial device corresponds to a remote identifier which is transmitted within the geographical area or reported for the geographical area; and providing an alarm notification based on the aerial device lacking a correspondence to a remote identifier which is transmitted within the geographical area or reported for the geographical area. Other implementations include corresponding systems, apparatus, and computer programs to perform the actions of methods defined by instructions encoded on computer readable storage.

These and other implementations can include one or more of the following features. Implementations can include receiving, from the aerial device, information that indicates an identity, location, or activity of the aerial device; and verifying the received information based on information detected by the one or more network components or provided by an aerial device service supplier. In some implementations, the received information comprises a remote identifier associated with the aerial device. Implementations can include monitoring remote identifier broadcasts in the geographical area; performing an automated check for anomalous situations based on the monitoring of remote identifier broadcasts in the geographical area; detecting an anomalous situation based on the performing of the automated check; and providing a notification to a registered recipient in response to a detection of the anomalous situation.

Performing the automated check can include detecting, based on cellular network signaling, information related to the aerial device; determining a reported remote identifier for the aerial device; and detecting a discrepancy between the detected information and the reported remote identifier. Implementations can include receiving authentication messages based on public key encryption; using the authentication messages to determine authenticity of the remote identifier broadcasts in the geographical area; and determining one or more known remote identifiers based on a respective remote identifier broadcast determined to be authentic.

Implementations can include aggregating data collected based on said monitoring. Aggregating data can include collecting aviation-band information including transponder traffic; and providing a report based on the aggregation of the data. Implementations can include processing signals from a user equipment operating in the cellular network; determining, based on said processing signals, the user equipment is being carried by the aerial device; and comparing characteristics of the user equipment to one or more known remote identifiers in a corresponding geographical area to determine whether the user equipment is providing proper identification.

In another aspect, a technique can include receiving one or more first remote identifiers that are being broadcasted in a geographical area; receiving one or more second remote identifiers for the geographical area reported by an aerial device service supplier; detecting one or more user devices in the geographical area that appear to be aerial; identifying, from a set of one or more detected user devices, one or more suspect aerial devices that are not associated with the one or more first remote identifiers and the one or more second remote identifiers; and providing a notification comprising information regarding the set of one or more suspect aerial devices. Detecting one or more user devices in the geographical area that appear to be aerial can include processing signals from a user equipment received via a cellular network; and determining one or more properties of the signals that indicate the user equipment is performing aerial operations. The set of one or more suspect aerial devices can include an aerial device that is determined to be noncompliant based on non-transmission of a remote identifier. The set of one or more suspect aerial devices can include an aerial device that is determined to be noncompliant based on transmitting false information. Other implementations include corresponding systems, apparatus, and computer programs to perform the actions of methods defined by instructions encoded on computer readable storage.

Particular configurations of the technology described in this disclosure can be implemented so as to realize one or more of the following potential advantages. Suspicious or noncompliant aerial devices can be quickly detected. Detection of suspicious or noncompliant aerial devices can be automated. In reporting aerial device activity within a geographical area, compliant aerial devices can be readily separated from noncompliant aerial devices based on one or more described techniques.

The details of one or more implementations are set forth in the accompanying drawings and the description below.

Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
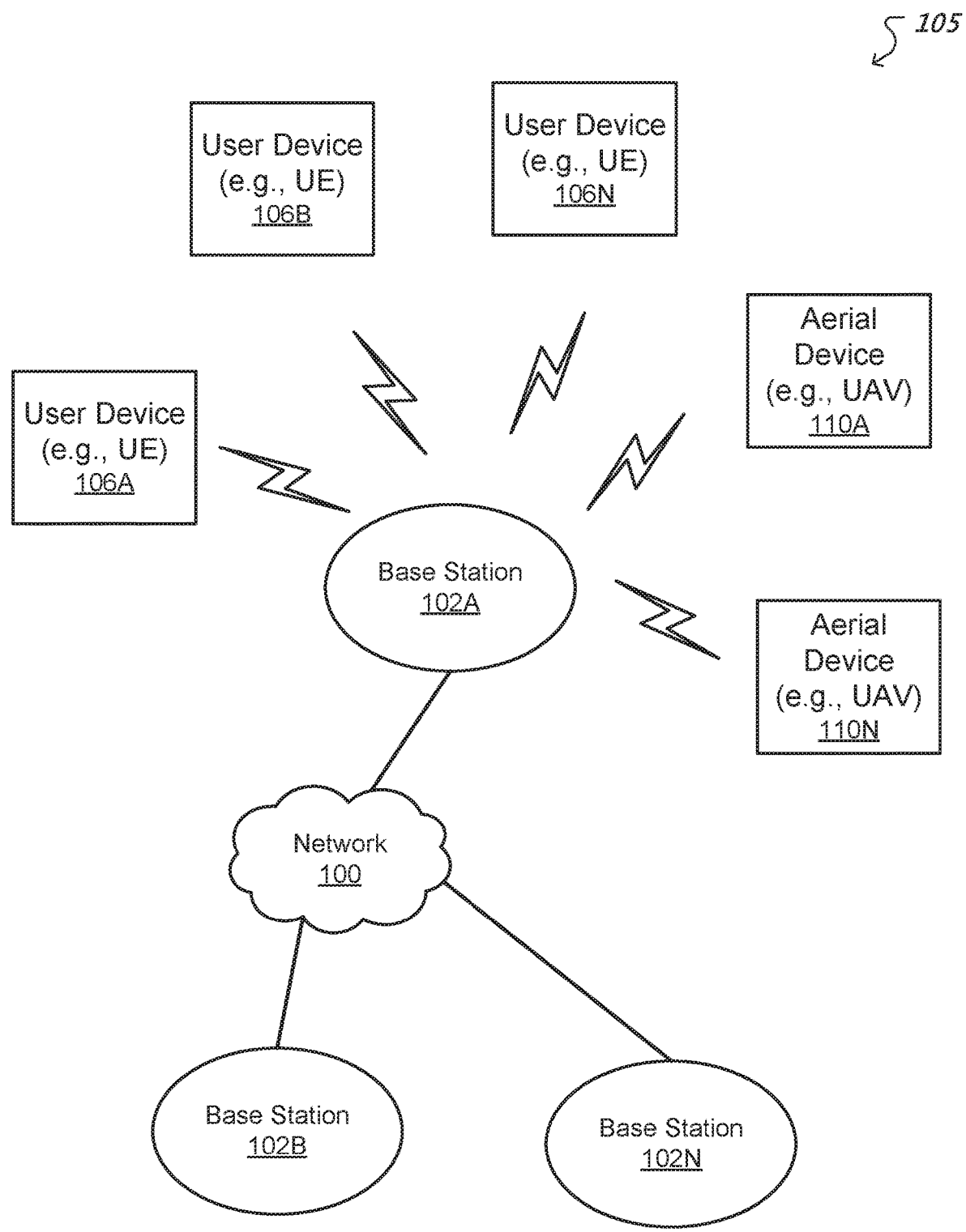
FIG. 1 illustrates an example of a wireless communication system.

Aerial devices such as UAVs are becoming commonplace and have to coexist with conventional aircraft. Unfortunately, aerial devices may be used for nefarious or other criminal purposes. As such, law enforcement and security entities are interested in tracking aerial devices. For example, a law enforcement agency may want to flag unauthorized UAVs upon their detection. One or more of the techniques in this disclosure use communication towers such as 4G/5G base station towers to act as a network of observation sentinels, identifying suspicious UAVs based on their radio frequency (RF) signals.

Some countries may require aerial devices such as a UAV to broadcast a remote identifier ("Remote ID") or be under the control of a USS, where the USS is configured to provide the remote identifier over a network in response to an authorized inquiry. As such remote identifiers can be provided via a broadcast (i.e., broadcast Remote ID) or via a network from a USS (i.e., networked Remote ID). This Remote ID can be considered as a form of an electronic license plate.

One use case of an electronic license plate is manual checking by law enforcement personnel. A smartphone application can be used by a police officer to visually identify drones based on the electronic license plates, e.g., remote identifiers. For example, when a police officer sees a UAV, the officer can point a smartphone camera at the drone to obtain the drone's identity. The smartphone application can monitor both broadcast and network based Remote IDs for the local area. The application can use sensors in the smartphone to detect where the camera is pointed, and then match locations of known license plates (either broadcast or networked) to the image on the screen. The application can, for example, bracket the identified spot in the sky and indicate the electronic license plate next to it, on the smartphone display. The police officer can then inquire further about the identity of a specific drone, from the electronic license plate. If a police officer can see a drone, but no Remote ID can be found indicating that there is a drone in this area, then this may indicate that the drone is a suspicious drone, and may warrant further attention.

Detecting whether a drone is suspicious, however, can be automated. The present disclosure describes an automated technique of detecting drones that are using a cellular network but not providing an electronic license plate. The present disclosure includes a technique for checking the validity of transmitted information such as a broadcasted remoted identifier. The systems of the present disclosure can be automated and persistently on, providing at least some level of checking 24/7 across the entire network area without human labor. Network components within a cellular network can be configured to automatically scan for and flag suspicious drones, providing a network of always-on sentinels against certain types of problematic drones.

In aviation, non-complying operators can be classified as clueless (does not know the rules), careless (knows but ignores rules, believing certain rules to be an unnecessary hassle), or criminal (actively seeks to circumvent the intent of rules). For the clueless and careless cases, the procedure is approximately the same. The Remote ID broadcast can be monitored across a distributed network of 4G/5G base stations, and compared to airspace rules. Noncompliant flights can be flagged to authorities.

Criminals may outfit an aerial device with a user device such as a user equipment (UE) to provide C2 information to the aerial device in order to remotely control the device. Moreover, criminals may attempt to operate the device anonymously by not causing the aerial device to transmit a remote identifier or registering the device with a USS such that the USS is able to provide the remote identifier. Alternatively, criminals may attempt to operate the device such that the aerial device transmits a false remote identifier. As such, one benefit is to catch cases where a UAV is not providing any electronic license plate by any means (e.g., the UAV is not broadcasting a remote identifier or a USS is not able to provide a remote identifier for the UAV) or is providing false information, but nonetheless is flying using a cellular modem, e.g., drone equipped with a UE. This is a significant case to catch, because it is easy to control a UAV using a cell phone modem, from long distances. The technical barriers to doing this are very low. This case is much discussed in law enforcement and defense communities, where a person with criminal intent uses a drone over a cellular network to deliver explosives or cause other problems, at little personal risk, because the person is far away from the intended target.

FIG. 1 illustrates an example of a wireless communication system 105. Other types of wireless communication systems are possible. The wireless communication system 105 includes a base station 102A which wirelessly communicates with one or more user devices 106A, 106B, ..., 106N. Each of the user devices 106A-N may be referred to herein as a UE or a UE device. The base station 102A is a type of a network component within a cellular network such as a LTE, LTE-Advanced (LTE-A), or 5G new radio (5G NR) cellular network. Other types of networks are possible. The base station 102A can wirelessly communicate with one or more aerial devices such as UAVs 106A, 106N. In some implementations, a UAV 106A-N include a user device 106 to communicate with the base station 102A.

The base station (BS) 102A may be a base transceiver station (BTS) or cell site (a "cellular base station") and can include hardware that enables wireless communication with the user devices 106A-N. The communication area (or coverage area) of the base station may be referred to as a "cell." The base station 102A and the user devices 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G NR, HSPA, or 3GPP2 CDMA2000 (e.g., 1×RTT, 1×EV-DO, HRPD, eHRPD), or combinations of them, among others. Note that if the base station 102A is implemented in the context of LTE, it may alternately be referred to as an 'eNodeB' or 'eNB.' Note that if the base station 102A is implemented in the context of 5G NR, it may alternately be referred to as 'gNodeB' or 'gNB.'

The base station 102A is equipped to communicate with a network 100 (e.g., a core network of a cellular service provider, a telecommunication network such as a public switched telephone network (PSTN), or the Internet, or combinations of them, among others). Thus, the base station 102A may facilitate communication between the user devices and between the user devices and the network 100. In particular, the cellular base station 102A may provide user devices 106 with various telecommunication capabilities, such as voice, SMS, and data services.

The base station 102A and other similar base stations (such as base stations 102B ... 102N) operating according to the same or a different cellular communication standard can include a network of cells, which may provide continuous or nearly continuous overlapping service to user devices 106A-N and similar devices over a geographic area in accordance with, for example, one or more cellular communication standards.

Thus, while the base station 102A may act as a "serving cell" for the user devices 106A-N as illustrated in FIG. 1, each user device 106 may also be capable of receiving signals from (and possibly within communication range of) one or more other cells (which might be provided by base stations 102B-N or any other base stations, or by UEs themselves), which may be referred to as "neighboring cells." Such cells may also be capable of facilitating communication between user devices and/or between user devices and the network 100. Such cells can include "macro" cells, "micro" cells, "pico" cells, and/or cells which provide any of various other granularities of service area size. For example, the base stations 102A-B illustrated in FIG. 1 might be macro cells, while the base station 102N might be a micro cell. Other configurations are also possible.

In some implementations, the base station 102A may be a next generation base station, e.g., a 5G New Radio (5G NR) base station, or "gNB." In some implementations, a gNB may be connected to a legacy evolved packet core (EPC) network or to a NR core (NRC) network, among others. In addition, a gNB cell can include one or more transition and reception points (TRPs). In addition, a UE capable of operating according to 5G NR may be connected to one or more TRPs within one or more gNBs.

Note that a user device 106 may be capable of communicating using multiple wireless communication standards. For example, the user device 106 may be configured to communicate using a wireless networking (e.g., Wi-Fi) or peer-to-peer wireless communication protocol (e.g., Bluetooth or Wi-Fi peer-to-peer), or both, in addition to at least one cellular communication protocol (e.g., GSM, UMTS (associated with, for example, WCDMA or TD-SCDMA air interfaces), LTE, LTE-A, 5G NR, HSPA, or 3GPP2 CDMA2000 (e.g., 1×RTT, 1×EV-DO, HRPD, eHRPD), or combinations of them, among others). The user device 106 may also (or alternatively) be configured to communicate using one or more global navigational satellite systems (GNSS), such as GPS or GLONASS, one or more mobile television broadcasting standards (e.g., ATSC-M/H or DVB-H), and/or any other wireless communication protocol, if desired. Other combinations of wireless communication standards (including more than two wireless communication standards) are also possible.

Figure 2A:
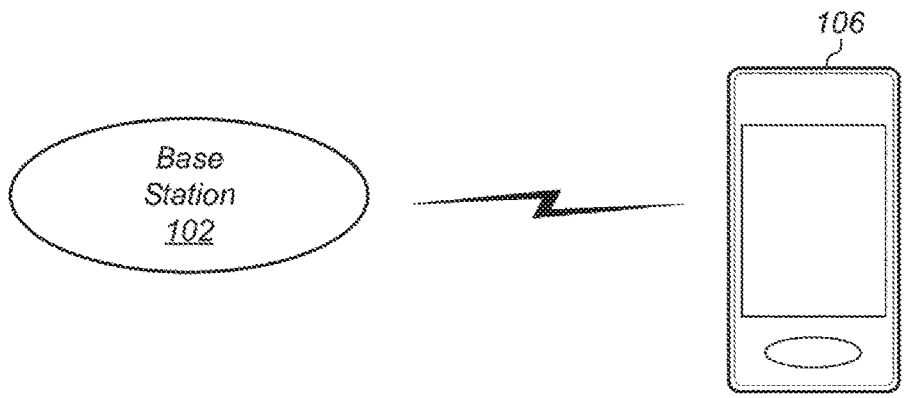
FIG. 2A illustrates an example of a base station in communication with a user device.

FIG. 2A illustrates an example of a user device 106 (e.g., one of the devices 106A through 106N) in communication with a base station 102. The user device 106 may be a device with cellular communication capability such as a mobile phone, a hand-held device, a computer or a tablet, or virtually any type of wireless device, including wireless sensors, surveillance equipment, or wearables devices, among others. In some implementations, the user device 106 is a reduced capability or "light" UE, as described below.

The user device 106 can include a processor that is configured to execute program instructions stored in memory. The user device 106 may perform any of the method embodiments described herein by executing such stored instructions. Alternatively, or in addition, the user device 106 can include a programmable hardware element such as an FPGA (field-programmable gate array) that is configured to perform any of the method embodiments described herein, or any portion of any of the method embodiments described herein.

The user device 106 can include one or more antennas for communicating using one or more wireless communication protocols or technologies. In some implementations, the user device 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio can include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the user device 106 may share one or more parts of a receive or transmit chain, or both, between multiple wireless communication technologies, such as those discussed above.

In some implementations, the user device 106 includes separate transmit or receive chains, or both, (e.g., including separate antennas and other radio components) for each wireless communication protocol with which it is configured to communicate. In some implementations, the user device 106 can include one or more radios which are shared between multiple wireless communication protocols, and one or more radios which are used exclusively by a single wireless communication protocol. For example, the user device 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2B:
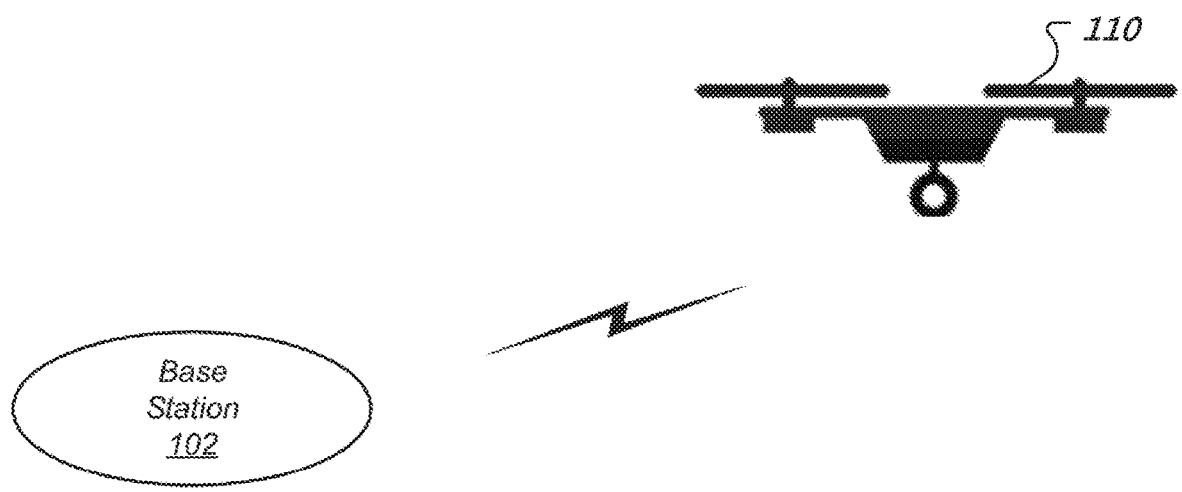
FIG. 2B illustrates an example of an aerial device in communication with a base station.

FIG. 2B illustrates an example of an aerial device 110 (e.g., one of the devices 110A through 106N) in communication with a base station 102. In some implementations, the aerial device 110 includes a user device 106. In some implementations, the base station 102 monitors for information broadcasted by an aerial device 110 such as a remote identifier. In some case, an off-the-shelf user device can be attached to a drone such that the drone is able to communicate with an operator via a cellular network. Note that an aerial device can be referred to as an aerial vehicle.

Figure 3:
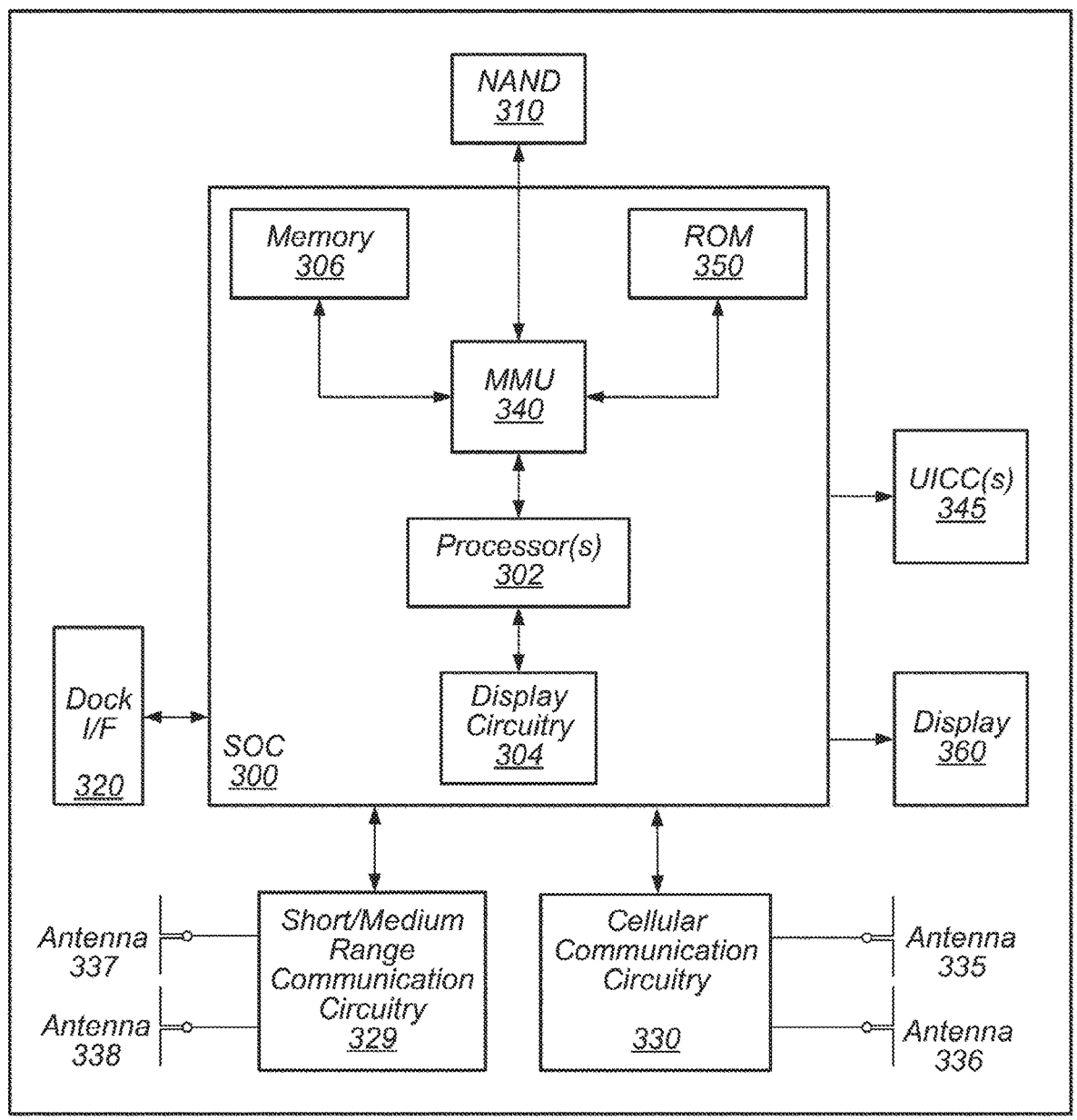
FIG. 3 illustrates an example block diagram of a communication device such as a user device or an aerial device with communication capabilities.

FIG. 3 illustrates an example block diagram of a communication device 301. It is noted that the block diagram of the communication device 301 in FIG. 3 is only one example of a possible communication device. In some implementations, communication device 301 can be referred to as a UE device, mobile device, mobile station, a wireless device or wireless station, a desktop computer or computing device, a mobile computing device (e.g., a laptop, notebook, or portable computing device), a tablet, a wireless sensor, a video surveillance system, or a wearable device, or a combination of them, among other devices. As shown, the communication device 301 can include a set of components 300 configured to perform core functions. For example, this set of components may be implemented as a system on chip (SOC), which can include portions for various purposes. Alternatively, this set of components 300 may be implemented as separate components or groups of components for the various purposes. The set of components 300 may be coupled (e.g., communicatively; directly or indirectly) to various other circuits of the communication device 301.

For example, the communication device 301 can include various types of memory (e.g., including NAND flash 310), an input/output interface such as connector I/F 320 (e.g., for connecting to a computer system; dock; charging station; input devices, such as a microphone, camera, keyboard; output devices, such as speakers), a display 360, which may be integrated with or external to the communication device 301, and cellular communication circuitry 330 such as for 5G NR, LTE, GSM, among others, and short to medium range wireless communication circuitry 329 (e.g., Bluetooth™ and WLAN circuitry). In some implementations, the communication device 301 can include wired communication circuitry (not shown), such as a network interface card, e.g., for Ethernet.

The cellular communication circuitry 330 may couple (e.g., communicatively; directly or indirectly) to one or more antennas, such as antennas 335 and 336. The short to medium range wireless communication circuitry 329 may also couple (e.g., communicatively; directly or indirectly) to one or more antennas, such as antennas 337 and 338. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 or cellular communication circuitry 330, or both, can include multiple receive chains and multiple transmit chains for receiving and transmitting multiple spatial streams, such as in a multiple-input multiple output (MIMO) configuration.

In some implementations, the cellular communication circuitry 330 can include dedicated receive chains (including and/or coupled to, e.g., communicatively; directly or indirectly dedicated processors and/or radios) for multiple RATs (e.g., a first receive chain for LTE and a second receive chain for 5G NR). In addition, in some implementations, the cellular communication circuitry 330 can include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 301 may also include or be configured for use with one or more user interface elements. The user interface elements can include any of various elements, such as the display 360 (which may be a touchscreen display), a keyboard (which may be a discrete keyboard or may be implemented as part of a touchscreen display), a mouse, a microphone, a speaker, one or more cameras, one or more buttons, or combinations of them, among various other elements capable of providing information to a user or receiving or interpreting user input. The communication device 301 may further include one or more smart cards 345 that include SIM (Subscriber Identity Module) functionality, such as one or more UICC(s) (Universal Integrated Circuit Card(s)) cards 345.

As shown, the SOC 300 can include processor(s) 302, which may execute program instructions for the communication device 301 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some implementations, the MMU 340 may be included as a portion of the processor(s) 302.

The communication device 301 can include hardware and software components for implementing the above features for time division multiplexing UL data for NSA NR operations. The processor 302 of the communication device 301 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 301, in conjunction with one or more of the other components 300, 304, 306, 310, 320, 329, 330, 340, 345, 350, 360 may be configured to implement part or all of the features described herein. The processor 302 can include one or more processing elements. For example, the processor 302 can include one or more integrated circuits (ICs) that are configured to perform the functions of the processor 302. Each integrated circuit can include circuitry (e.g., first circuitry, second circuitry, among other circuitry) configured to perform the functions of processor(s) 302.

Further, the cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 can include one or more integrated circuits (ICs) that are configured to perform the functions of cellular communication circuitry 330. In addition, each integrated circuit can include circuitry (e.g., first circuitry, second circuitry, etc.) configured to perform the functions of cellular communication circuitry 230. Similarly, the short range wireless communication circuitry 329 can include one or more ICs that are configured to perform the functions of short range wireless communication circuitry 32. In addition, each integrated circuit can include circuitry (e.g., first circuitry, second circuitry, etc.) configured to perform the functions of short range wireless communication circuitry 329.

Figure 4:
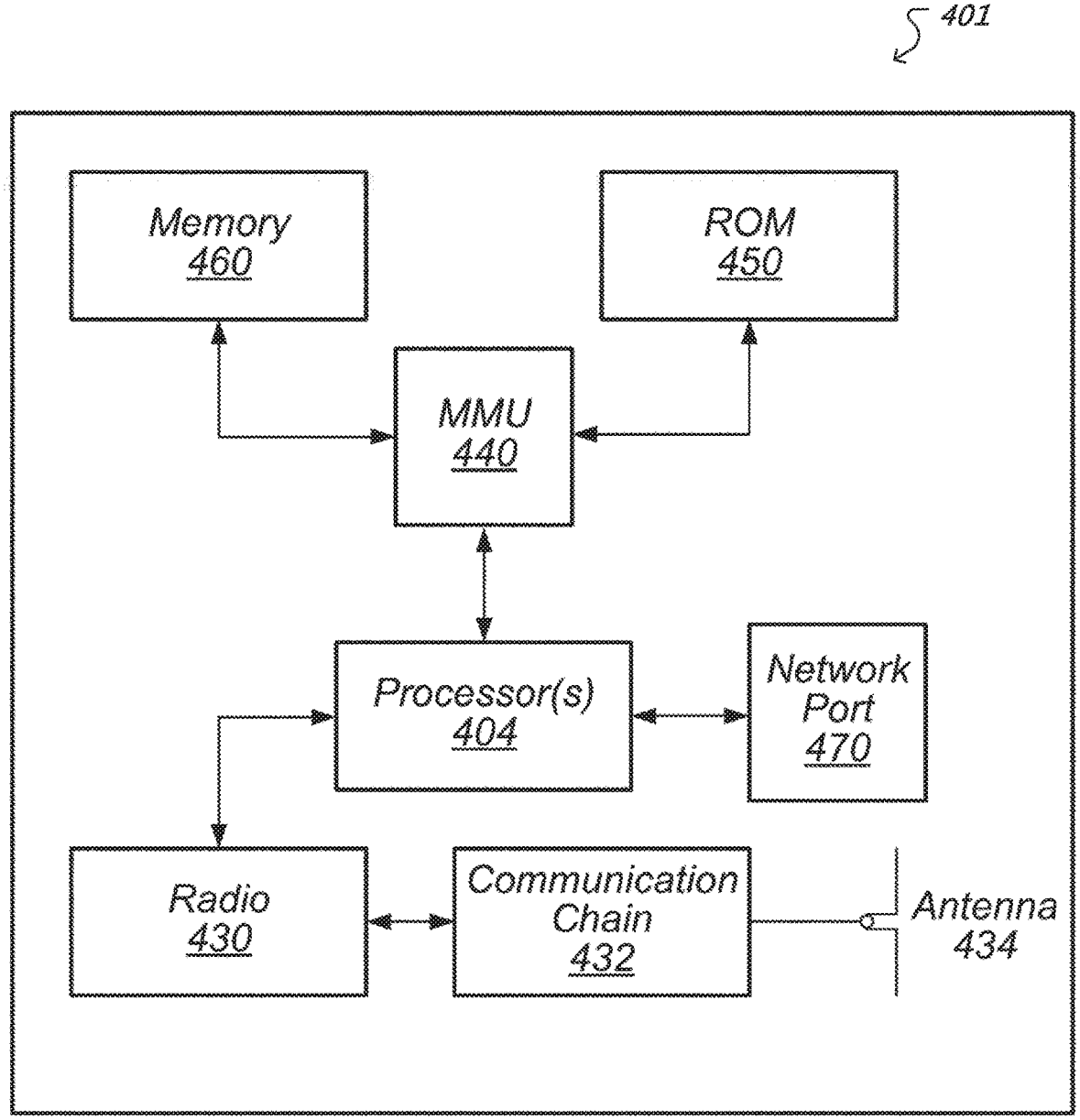
FIG. 4 illustrates an example block diagram of a base station.

FIG. 4 illustrates an example block diagram of a base station 401. It is noted that the base station of FIG. 4 is an example of a possible base station. As shown, the base station 401 includes processor(s) 404 which may execute program instructions for the base station 401. The processor(s) 404 may be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 401 can include at least one network port 470. The network port 470 may be configured to couple to a telephone network and provide a plurality of devices, such as UE devices 106, access to the network such as the Internet. The network port 470 (or an additional network port) may also or alternatively be configured to couple to a core network of a cellular service provider. The core network may provide mobility related services or other services to a plurality of devices, such as UE devices 106. In some implementations, the network port 470 couples a telephone network using the core network, or the core network may provide a telephone network (e.g., among other UE devices serviced by the cellular service provider).

In some implementations, the base station 401 is a next generation base station, e.g., a 5G New Radio (5G NR) base station, or "gNB". In such embodiments, base station 401 may be connected to a legacy evolved packet core (EPC) network and/or to a NR core (NRC) network. In addition, base station 401 may be considered a 5G NR cell and can include one or more transition and reception points (TRPs). In addition, a UE capable of operating according to 5G NR may be connected to one or more TRPs within one or more gNBs.

The base station 401 can include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, or Wi-Fi, or combinations of them, among others.

The base station 401 may be configured to communicate wirelessly using multiple wireless communication standards. In some instances, the base station 401 can include multiple radios, which may enable the base station 401 to communicate according to multiple wireless communication technologies. For example, as one possibility, the base station 401 can include an LTE radio for performing communication according to LTE as well as a 5G NR radio for performing communication according to 5G NR. In such a case, the base station 401 may be capable of operating as both an LTE base station and a 5G NR base station. In some implementations, the base station 401 can include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, or combinations of them, among others).

The BS 401 can include hardware and software components for implementing or supporting implementation of features described herein. The processor 404 of the base station 401 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 401, in conjunction with one or more of the other components 430, 432, 434, 440, 450, 460, 470 may be configured to implement or support implementation of part or all of the features described herein.

In some implementations, the processor(s) 404 are comprised of one or more processing elements. In other words, one or more processing elements may be included in processor(s) 404. Thus, processor(s) 404 can include one or more integrated circuits (ICs) that are configured to perform the functions of processor(s) 404. In addition, each integrated circuit can include circuitry (e.g., first circuitry, second circuitry, among other circuitry) configured to perform the functions of the processor(s) 404. In some implementations, the radio 430 is comprised of one or more processing elements. In other words, one or more processing elements may be included in radio 430. Thus, radio 430 can include one or more integrated circuits (ICs) that are configured to perform the functions of radio 430. In addition, each integrated circuit can include circuitry (e.g., first circuitry, second circuitry, etc.) configured to perform the functions of radio 430.

Network components, such as a BS 401, can be configured to detect suspicious aerial devices. Further, network components, such as a BS 401, can be configured to receive transmissions from aerial devices such as a remote identifier broadcast. In some implementations, a BS 401 can be configured to determine whether a UE is operating in a fashion that is consistent with aerial operations, e.g., flying around at altitude greater than ground level. In some implementations, a UE can be configured to transmit an aerial indicator. In some implementations, a SIM card being used in an aerial UE can be configured with an aerial indicator parameter.

Figure 5:
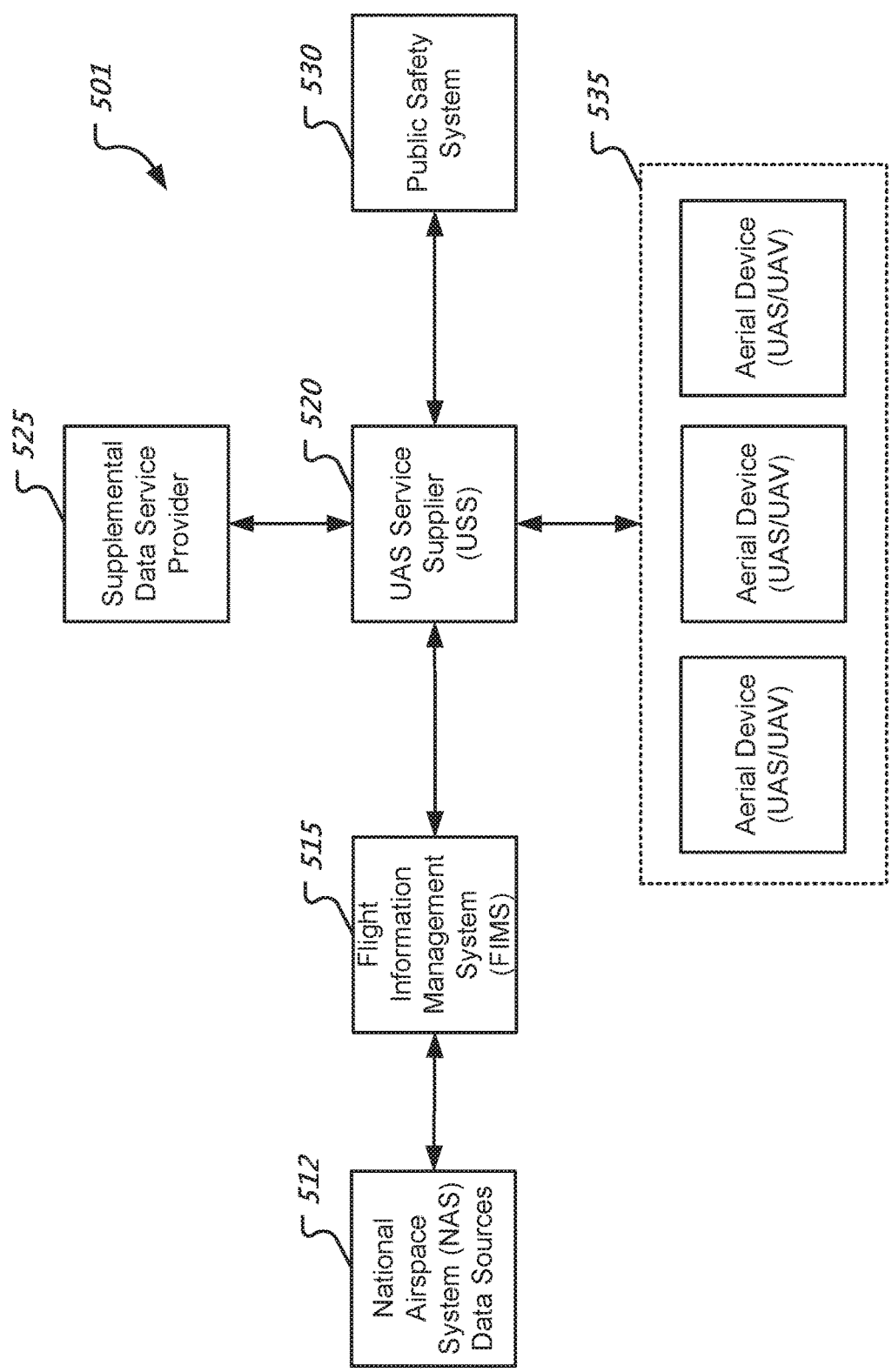
FIG. 5 illustrates an example of an UTM architecture.

FIG. 5 illustrates an example of an UTM architecture 501. The UTM, also referred to as a U-space system, is based on a public/private paradigm, where the aviation authority in each country can delegate aerial device traffic management to private companies. An Air Navigation Service Provider (ANSP) such as the FAA in the U.S., provides air traffic management (ATM) services for operations within the National Airspace System (NAS). The UTM architecture 501 includes a Flight Information Management System (FIMS) 515 which is operated by the ANSP. The FIMS 515 can access NAS data sources 512 provided by the FAA such as NAS state information, aircraft databases, radar contacts, and transponder information. The FIMS 515 interfaces with the UAS Service Supplier (USS) 520, which is the central controlling entity on the "private" side of the public/private partnership. In some implementations, the FIMS 515 can provide constraints and directives for aerial devices to the USS 520. In some implementations, the USS 520 may operate in local hardware or in a computing cloud. In some implementations, the USS 520 includes distributed components including components located within a cellular network.

Other components of the UTM architecture 501 include supplemental data service providers 525, aerial devices 535 and their operators, and public safety systems 530. In some implementations, the supplemental data service providers 525 can provide data such as terrain, weather, surveillance, and performance information. In some implementations, the USS 520 provides an aerial device registration service to operators of aerial devices 535. In some implementations, aerial device operators can send operational requests to the USS 520, and the USS 520 can provide an response (e.g., granted, denied), operating constraints, etc. In some implementations, the USS 520 can forward operational requests to the FIMS 515 for approval. In some implementations, the aerial devices 535 can use a vehicle-to-vehicle (V2V) communication protocol to interact with other devices. In some implementations, the USS 520 can provide remote identifiers for aerial devices to a public safety system 530.

The aerial devices 535 may be required to broadcast a remote identifier which can be referred to as an electronic license plate. In some implementations, the remote identifier transmitted in accordance with ASTM F.38. A draft of the ASTM F.38 Remote ID specification specifies the broadcast of a remote identifier from a drone via a short-range communication protocol such as Bluetooth or Wi-fi. The ASTM F.38 Remote ID specification also specifies that if the drone is being managed by a UTM, then a broadcast is not required. In this case, the USS 520 can provide position reports and remote identifiers for any aerial device in a geographical area. For example, the USS 520 can provide position reports and remote identifiers to a public safety system 530 for use by a police officer or by a special agent. Remote identifiers provided over a network can be referred to as a "Network based Remote ID." Applications with access to drone positions and identifiers can merge the identifiers and positions received by broadcast or by a network from a USS can fuse the data into a unified representation of activity within a geographical area.

Figure 6:
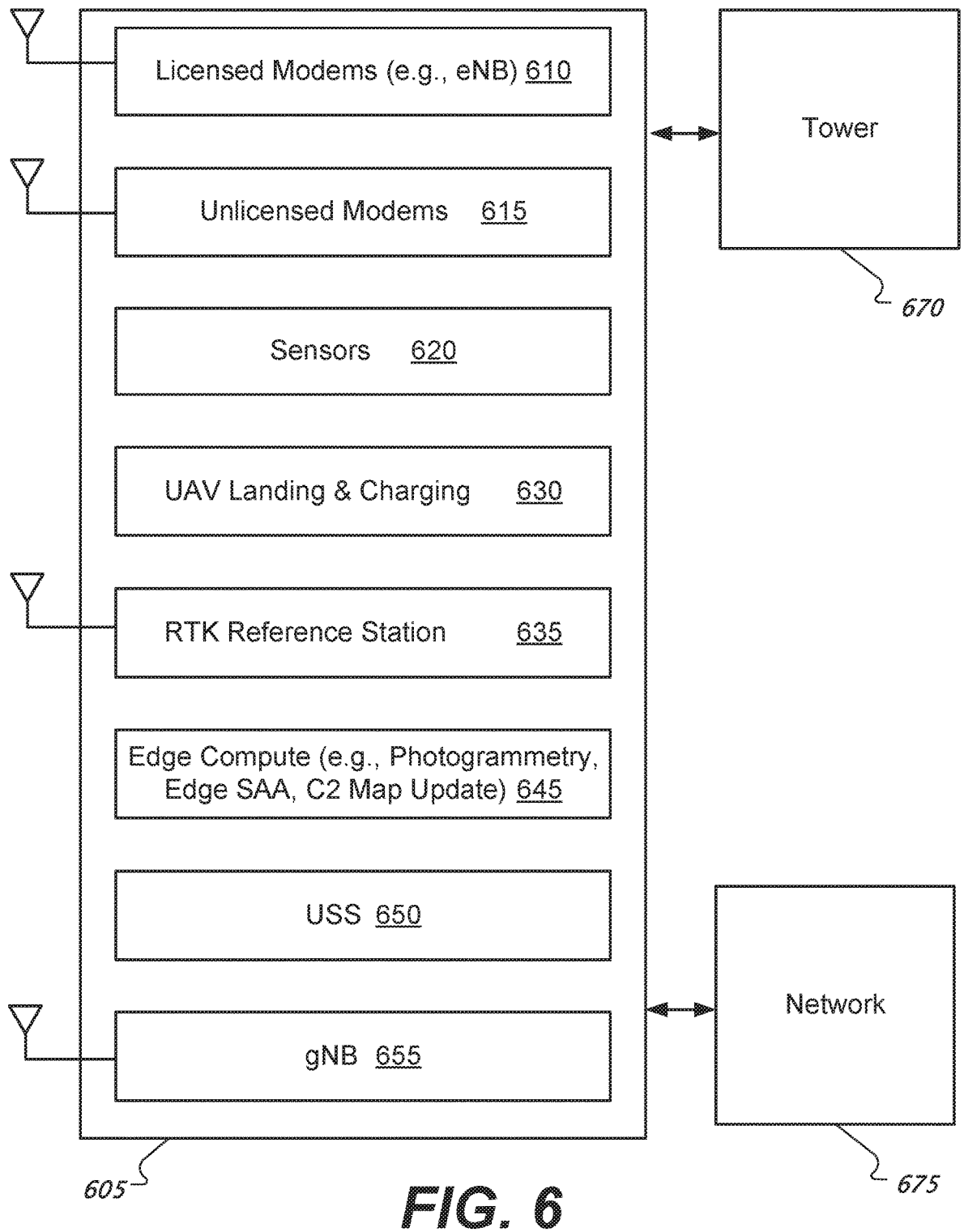
FIG. 6 illustrates an example of a network component such as a converged tower that includes USS functionality for monitoring and managing aerial device traffic.

FIG. 6 illustrates an example of a network component of a cellular network such as a converged tower 605 that includes USS functionality for monitoring and managing aerial device traffic. In some implementations, a converged tower 605 in a 5G network, such as the one shown in FIG. 6, can provide wireless communications for the UTM as well as provide the distributed computing network which hosts a USS. The converged tower 605 can include one or more licensed modems 610 for wireless carriers (e.g., Verizon, AT&T, etc.) and unlicensed modems 615 (e.g., Wi-Fi, Terragraph, etc.).

The converged tower 605 can include smart city sensors 620 such as cameras, microphones, and air quality sensors. The tower 605 can provide aviation-related functions such as a UAV landing and charging site 630, real-time kinematic (RTK) reference station 635, aviation band receiver 640, receivers for remote ID broadcast, USS instance 650 such as the one shown in FIG. 5, and edge computing functions 645 such as photogrammetry to produce 3D point cloud from geotagged images, sense and avoid functions for the traffic control system, mapping of the RF environment, and DLNN for recognizing aerial UE. The converged tower 605 can include a gNB 655. There can be UTM and C2 coordination among the gNB 655 and the USS instance 650. In some implementations, the USS 650 uses aviation information received via one or more aviation band receivers 640 and other types of reception of RF information from the local environment to monitor aerial device activity.

The converged tower 605 can communicate with another tower 670 via an inter-tower interconnect such as a Xn Interface or a USS-USS interface. The converged tower 605 can communicate with a network via a backhaul such as a NG interface, FIMS, SDSP interface. In some implementations, different USS instances residing on different towers may communicate with each other via an Xn interface. In some implementations, the USS instance 650 of tower 605 may communicate with a FIMS (e.g., FIMS 515 in FIG. 5) via the network 675. Potential advantages of locating one or more USS functions on a tower can include providing a local USS instance and providing low-latency interconnect with other local USS instances, low-latency communication with the gNB, and low-latency communication with edge computing functions.

Figure 7:
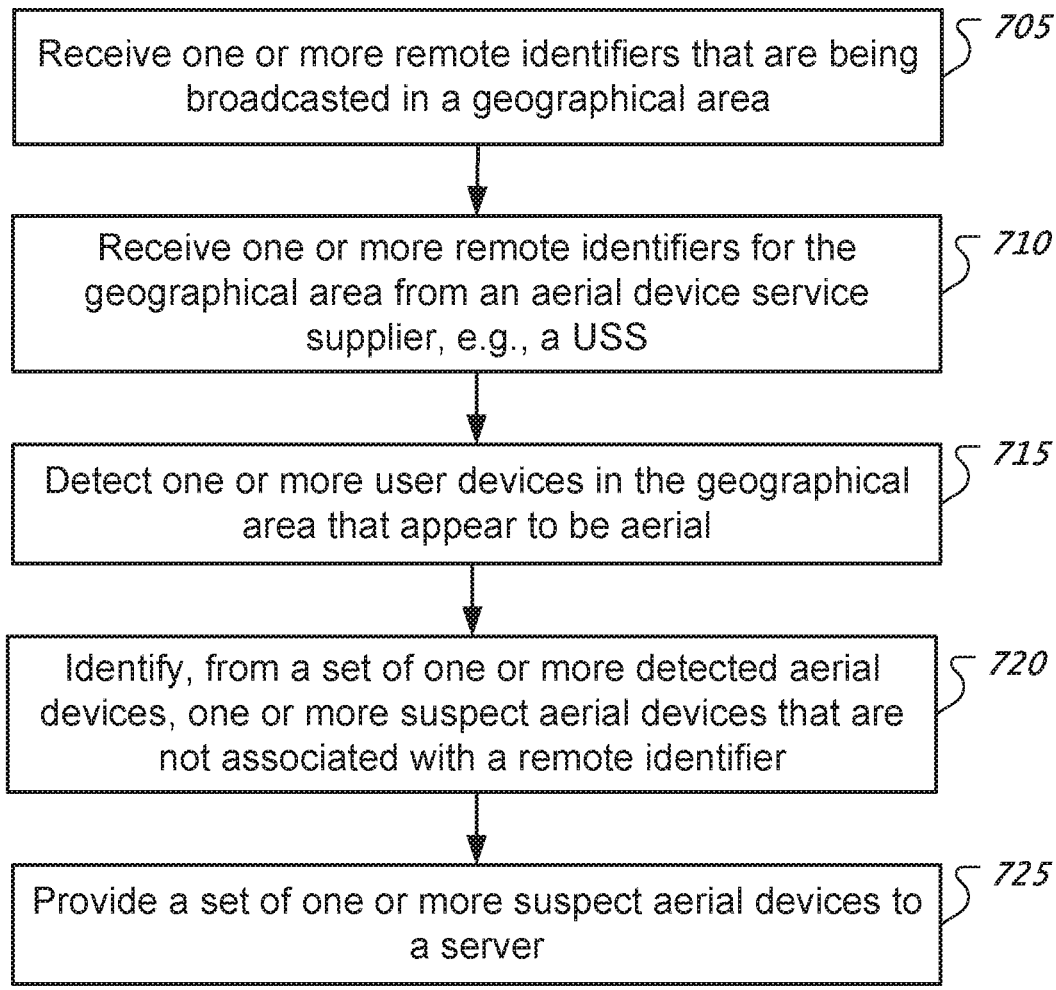
FIG. 7 illustrates a flowchart of an example process for determining suspect aerial devices.

FIG. 7 illustrates a flowchart of an example process for determining suspect aerial devices. In some implementations, the process can be performed by one or more network components. In some implementations, the process can be perform in part by a USS. At 705, the process includes receiving one or more remote identifiers that are being broadcasted in a geographical area. In some implementations, receiving one or more remote identifiers includes receiving Bluetooth or Wi-Fi broadcasts of electronic license plates at a base station such as a 5G tower. In some implementations, a remote identifier includes one or more of a position report, owner/operator identity, or owner/operate contact details. In some implementations, a remote identifier includes a n-bit number that provides a unique identity. In some implementations, the remote identifier includes a UAV type identifier, operating status, timestamp, flight route information, and current speed. In some implementations, a geographical area corresponds to an area covered by one or more base stations. In some implementations, a geographical area is defined by a set of coordinates.

At 710, the process includes receiving one or more remote identifiers for the geographical area from an aerial device service supplier, e.g., a USS. In some implementations, a remote identifier includes one or more of a position report, owner/operator identity, or owner/operate contact details. In some implementations, a remote identifier includes a n-bit number that provides a unique identity. In some implementations, receiving one or more remote identifiers includes receiving a networked remote ID for the local area over a backhaul coupled with the Internet. In some implementations, the process includes sending a query for a geographical area to the aerial device service supplier for known remote identifiers that are associated with aerial devices operating in the area.

At 715, the process includes detecting one or more user devices in the geographical area that appear to be aerial. In some implementations, the process includes detecting a user device such as a UE in a local sector that appears to be aerial. In some implementations, the process uses characteristics of the device's signal transmissions such as Doppler, reported position, Reference Signal Received Quality (RSRQ), and Reference Signal Received Power (RSRP), to determine whether the user device is aerial. In some implementations, the process uses a machine learning technique such as a dynamic learning neural network (DLNN) trained with various modem statistics from both aerial UE and non-aerial UE devices, so that it can classify a new UE as aerial or non-aerial. In some implementations, the process uses a DLNN that is trained on modem log information such as a device's Doppler properties, reported position, RSRP, RSRQ, or a combination thereof. A device's Doppler properties can indicate whether the device is moving towards a base station or away from the base station and can indicate the speed of the device. In some implementations, a reported position includes an altitude value. In some implementations, detecting one or more user devices in the geographical area that appear to be aerial can include monitoring for drone-related C2 message traffic.

At 720, the process includes identifying, from a set of one or more detected aerial devices, one or more suspect aerial devices that are not associated with a remote identifier. In some implementations, the process generates a set of detected aerial devices, and generates a set of devices that are associated with a remote identifier based on information received at 705 and 710. The process subtracts, i.e., removes, from the set of detected aerial devices the set of devices that are associated with a remote identifier to produce a set of one or more suspect devices. In some implementations, the set of one or more suspect devices includes UAVs that appear to be aerial, but also appear not to be transmitting a valid electronic license plate or identifying themselves with a USS. At 725, the process includes providing a set of one or more suspect aerial devices to a server. In some implementations, providing a set of one or more suspect devices includes flagging the suspect devices to law enforcement via a mechanism such as a database, report, or an application programming interface (API).

Figure 8:
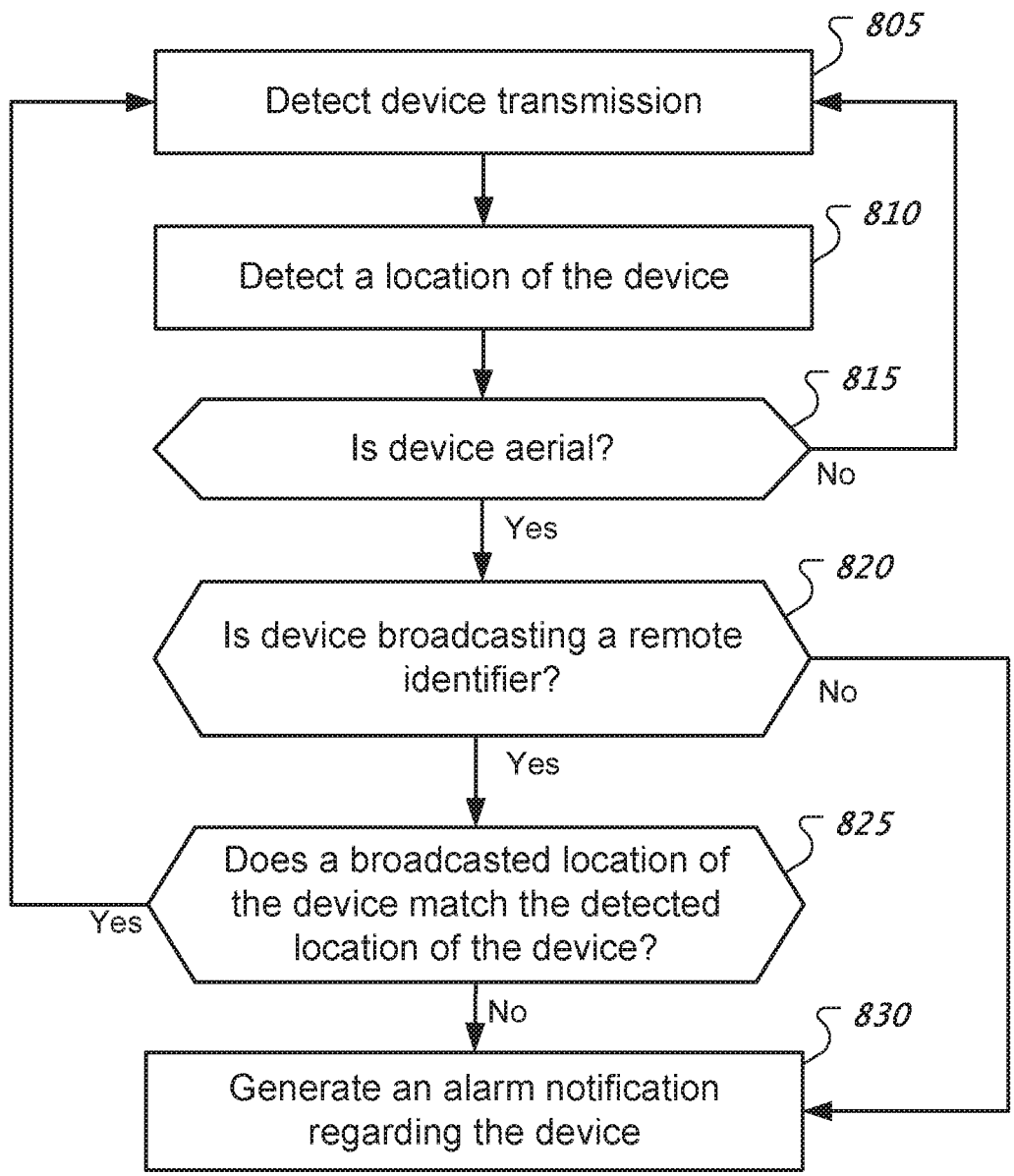
FIG. 8 illustrates a flowchart of an example process for determining whether an alarm notification should be generated for an aerial device.

FIG. 8 illustrates a flowchart of an example process for determining whether an alarm notification should be generated for an aerial device. At 805, the process detects a device transmission. In some implementations, detecting a device transmission includes detecting a remote identifier broadcast. In some implementations, detecting a device transmission includes detecting cellular transmissions. In some implementations, detecting a device transmission includes detecting a Bluetooth or Wi-Fi transmission. At 810, the process detects a location of the device. In some implementations, the process uses a time-of-arrival triangulation technique to detect the device's location.

At 815, the process determines whether the device is aerial. In some implementations, determines whether the device is aerial includes determining whether the device is performing aerial operations such as flying or hovering above the ground. In some implementations, the process uses characteristics of the device's signal transmissions such as Doppler, reported position, RSRQ, and RSRP to determine whether the device is aerial. If the device is not aerial, the process continues at 805. For example, a signal's Doppler property can be used to determine whether a device is moving towards a base station or away from the base station.

If the device is aerial, the process determines whether the device is broadcasting a remote identifier at 820. If the device is not broadcasting a remote identifier, the process generates an alarm notification regarding the device at 830. If the device is broadcasting a remote identifier, the process determines whether a broadcasted location matches the detected location of the device at 825.

If the broadcasted location does match the detected location of the device at 825, the process continues at 805. If the broadcasted location does not match the detected location of the device at 825, the process generates an alarm notification regarding the device at 830.

In some implementations, the process can compare an apparent position of a mobile device, e.g., a UE attached to a UAV, as detected by the cell phone network to the position reported in an electronic license plate broadcasted by the device. In some implementations, the electronic license place is encoded in a remote identifier, and can include position and/or velocity information. The cell phone network, for example, can detect an apparent device position based on a time-of-arrival triangulation or GNSS reports from the UE. In some implementations, the process can flag a mismatch between a detected position of the device and a broadcasted position of the device, e.g., the device is falsifying its position report.

In some implementations, the process can monitor the broadcast for validity. The device's broadcasted information can include an authentication packet. The authentication packet can include a cryptographic checksum that covers the broadcasted remote identifier and generated based on a certificate from a central certificate authority. The cryptographic checksum can be used to determine whether a license associated with the remote identifier is expired or invalid. In some implementations, the process can include an automated check for an expired license, an invalid license, or other license that authorities have reason to monitor.

In some implementations, the process can include monitoring, by a device such as a converged tower or other cell phone tower, common unlicensed commands and/or control protocols, such as those for off-the-shelf drones, e.g., DJI drones. Detection of an unlicensed command can cause the process to signal an event that one or more off-the-shelf drones are being controlled by a hand-held controller. The process can check these one or more drones against a set of remote identifiers, e.g., broadcasted or networked remote identifiers, to identify any that are being flown near the tower by an off-the-shelf handheld controller, and are either not transmitting an electronic license plate or transmitting erroneous data in the electronic license plate.

In some implementations, the process can include operating UAVs to receive Remote ID broadcasts from other UAVs and report those received broadcasts to the network, effectively augmenting the network of surveillance receivers beyond the fixed network of cellular towers. In some implementations, the process can use aggregated information including remote identifiers received at multiple towers to form a complete air traffic picture, which can then be provided by cell towers to various avionics applications including terrestrial and on-vehicle applications. In some implementations, the process can detect a noncompliant drone and actively cause interference with the C2 communication of the noncompliant drone to disrupt the drone's operation. As such, a network of 5G towers, 4G towers, and/or older towers can be configured to function as a dense network of sentinels against certain types of UAV attacks.

In some cases, the UAV is not actively transmitting or receiving signals and may be programmed to fly a route without any cell phone connections or other types of connections, as such an aerial vehicle could be completely "dark" in terms of RF transmissions, e.g., no electronic license plate transmissions and no C2 communications. Such a vehicle could be detected with primary surveillance such as radar. The network of towers can provide information to exclude compliant drones from primary surveillance contacts to generate a refined list of potential noncompliant drones.

Figure 9:
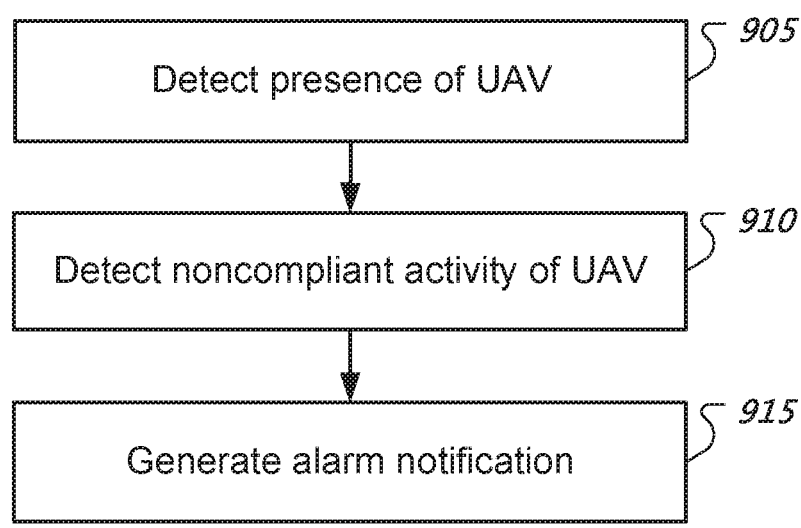
FIG. 9 illustrates a flowchart of an example of a process for generating an alarm notification based on noncompliant aerial device activity.

FIG. 9 illustrates a flowchart of an example of a process for generating an alarm notification based on noncompliant aerial device activity. The process may be performed by one or more network components. In some implementations, the network components may be disposed in, or proximal with, an access node. In some implementations, the one or more network components may be distributed throughout a network. For example, some components may be in an access network, while other components may be in a core network or other network. At 905, the process includes detecting a presence of a UAV. The presence may be detected at a geographical area, which may correspond to one or more cells of an access network. The presence may be detected by signals reported to, for example, an access node by the UAV itself or another UE (aerial or terrestrial) that senses the UAV.

At 910, the process includes detecting a noncompliant activity of the UAV. In some implementations, the process can determine whether the UAV corresponds to a remote identifier which is transmitted within the geographical area or reported for the geographical area. In some implementations, noncompliant activity may result from the UAV not sending reports or information that it may be required to send. For example, the noncompliant activity may be the lack of a remote identifier broadcast. In some implementations, the noncompliant activity may be the result of the UAV sending false information, inaccurate information, or both.

At 915, the process includes generating an alarm notification. The alarm notification can include an identity of the UAV and information about the noncompliant activity. In some implementations, the alarm notification is based on the aerial device lacking a correspondence to a remote identifier which is transmitted within the geographical area or reported for the geographical area.

In some implementations, the alarm notification may be transmitted to one or more users that are registered and otherwise authorized to receive the information. In some implementations, the alarm notification may be broadcast by an access node in a cell in which the noncompliant activity is detected. This broadcast may be intended for all recipients in the cell, or a subset (e.g., first responders or law enforcement). The alarm notification may additionally/alternatively be sent to users of a backhaul connection.

A technique of one or more network components monitoring activity of an aerial device such as a UAV that communicates through a cellular network can include receiving, from the UAV, first information that is to include an indication of an identity, location, or activity (e.g., direction of travel) of the UAV; and verifying the first information based on information detected by or reported to the one or more network components. Verifying the first information can include performing an audit. The technique can include determining an identity, location, or activity of the UAV based on the information detected by or reported to the one or more network components; and verifying the first information based on the determining of the identity, location, or activity of the UAV. The technique can include verifying the first information based on information reported to the one or more network components from a source other than the UAV. The first information can include a Remote ID of the UAV.

Another technique of operating one or more network components to monitor UAV activity can include detecting a presence of a UAV; detecting noncompliant activity of the UAV, the noncompliant activity including non-transmission of a required report or information (e.g., Remote ID) or report of false or inaccurate information; and generating an alarm notification based on said detecting of the unauthorized activity.

Another technique of operating one or more network components to monitor UAV activity can include monitoring Remote ID broadcasts in a geographical area; and performing an automated check for anomalous situations based on the monitoring of the Remote ID broadcasts. Various types of anomalous situations can include noncompliant activity, device movement that is not consistent with device type, transmitting falsified or inaccurate information. The technique can include detecting an anomalous situation based on said performing of the automated check; generating an alarm notification based on said detecting of the anomalous situation; and providing the alarm notification to a registered recipient such as law enforcement personnel. Performing the automated check can include detecting, based on cellular network signaling, information related to a UAV; determining a reported Remote ID from the UAV; and detecting a discrepancy between the detected information and the reported remote ID.

Another technique of operating one or more network components to monitor UAV activity can include processing signals from a UE operating in a cellular network; determining, based on said processing signals, the UE is being carried by an aerial vehicle; and comparing characteristics of the UE to known Remote IDs in a corresponding geographical area to determine whether the UE is providing proper identification. Determining that the UE is being carried by an aerial vehicle can include using a DLNN on modem log information such as a device's Doppler information, reported position, RSRP, RSRQ, or a combination thereof. The technique can include determining proper identification based on Clean Air Act (CAA) regulations that apply to the corresponding geographical area. The technique can include receiving authentication messages based on public key encryption; using the authentication messages to determine authenticity of Remote ID broadcasts; and determining known Remote IDs based on Remote ID broadcasts determined to be authentic. The technique can include determining or otherwise augmenting information of aerial UEs by monitoring an RF environment for common command and control protocols for common drones, and looking for those which might be flying in the local area using one of these protocols, without a valid Remote ID. The technique can include receiving, from one or more aerial devices, information about an RF environment based on monitoring of the RF environment by the one or more aerial devices.

Another technique of operating one or more network components to monitor aerial device activity can include monitoring Remote ID broadcasts in a geographical area; aggregating data collected based on said monitoring; and generating a report based on the aggregation of the data; and sending the report to one or more users such as pilots, air traffic authorities, security personnel, or police personnel. Aggregating data can include collecting aviation-band information such as ADS-B or Mode-S transponder traffic. Collecting aviation-band information can be performed by an aviation-band receiver located on a cell tower.

Another technique of operating one or more network components to monitor aerial device activity can include receiving broadcast messages that include license plate information for one or more UAVs in a geographical area such as an area covered by a macro cell base station; receiving, networked remote ID information for the geographical area; determining one or more UEs are aerial based on signals received from the one or more UEs; and identifying a noncompliant UAV based on the electronic license plate information, the network remote ID information, and the determined one or more UEs that are aerial. The technique can include generating and transmitting a report with information related to the noncompliant UAV. In some implementations, the noncompliant UAV is determined to be noncompliant based on non-transmission of required report or information (e.g., Remote ID) or report of false or inaccurate information.

Implementations can include one or more non-transitory computer-readable media comprising instructions to cause an electronic device, upon execution of the instructions by one or more processors of the electronic device, to perform one or more of the techniques described herein. Implementations can include an apparatus comprising circuitry to perform one or more of the techniques described herein. Implementations can include an apparatus comprising one or more processors and one or more computer-readable media comprising instructions that, when executed by the one or more processors, cause the one or more processors to perform one or more of the techniques described herein. Information can be transmitted within a datagram, packet, frame, segment, protocol data unit (PDU), or message.

Figure 10:
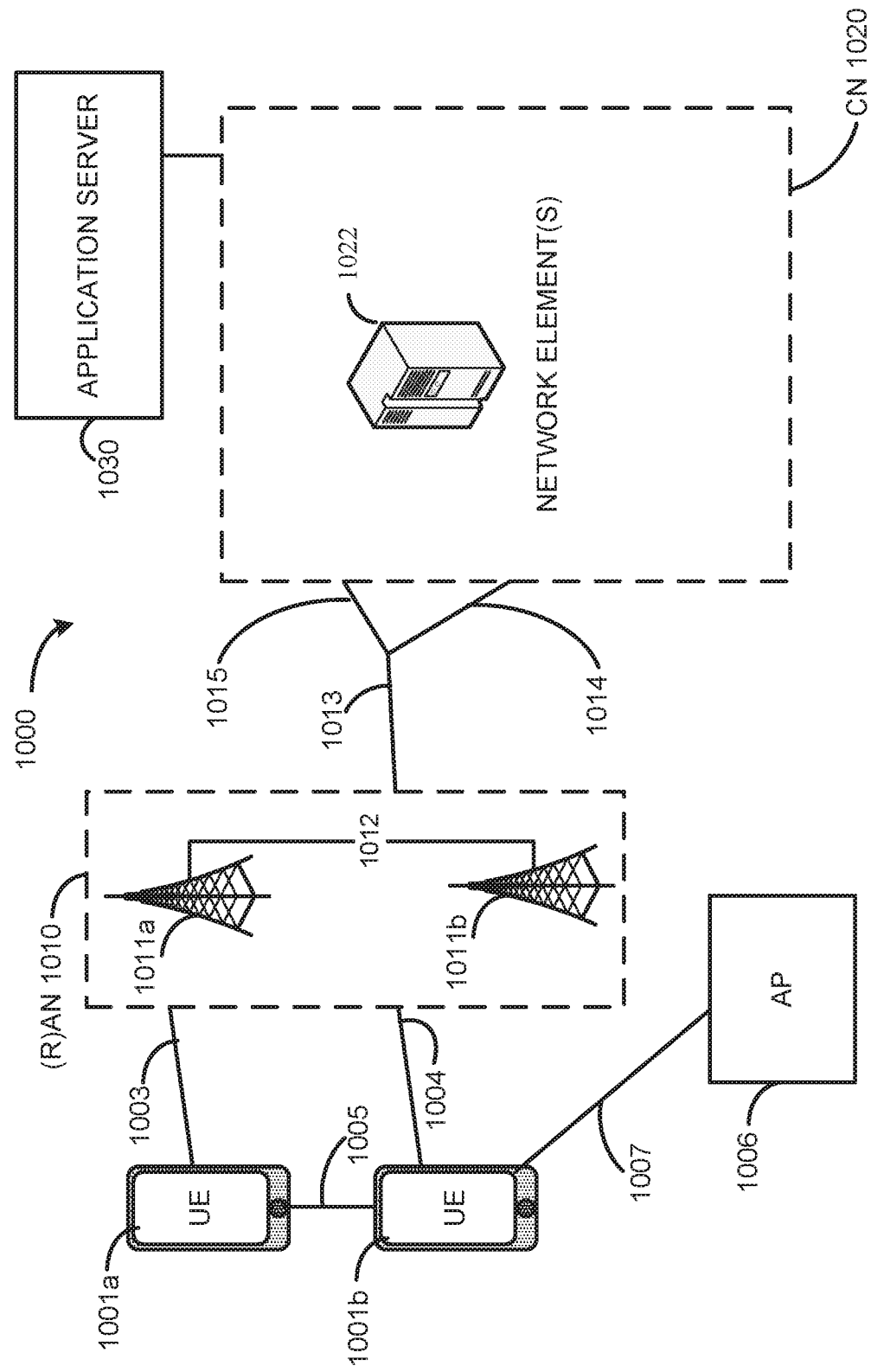
FIG. 10 illustrates an example architecture of a system of a network.

FIG. 10 illustrates an example architecture of a system 1000 of a network. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)).

The system 1000 includes UE 1001a and UE 1001b (collectively referred to as "UEs 1001" or "UE 1001"). The system 1000 further includes access nodes 1011a or 1011b, AP 1006, CN 1020, and application server 1030. One or more aerial devices such as UAVs can correspond to one or more UEs such as UEs 1001a or 1001b, likewise, the one or more network components that perform or otherwise assist in the monitoring and reporting of UAVs can be disposed in access nodes 1011a or 1011b, AP 1006, CN 1020, or application server 1030.

In this example, UEs 1001 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some implementations, any of the UEs 1001 may be IoT UEs, which can include a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which can include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 may be configured to connect, for example, communicatively couple, with an or RAN 1010. In some implementations, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

The UE 1001b is shown to be configured to access an AP 1006 (also referred to as "WLAN node 1006," "WLAN 1006," "WLAN Termination 1006," "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below). In various embodiments, the UE 1001b, RAN 1010, and AP 1006 may be configured to utilize LWA operation and/or LWIP operation. The LWA operation may involve the UE 1001b in RRC_CONNECTED being configured by a RAN node 1011a-b to utilize radio resources of LTE and WLAN. LWIP operation may involve the UE 1001b using WLAN radio resources (e.g., connection 1007) via IPsec protocol tunneling to authenticate and encrypt packets (e.g., IP packets) sent over the connection 1007. IPsec tunneling can include encapsulating the entirety of original IP packets and adding a new packet header, thereby protecting the original header of the IP packets.

The RAN 1010 can include one or more AN nodes or RAN nodes 1011a and 1011b (collectively referred to as "RAN nodes 1011" or "RAN node 1011") that enable the connections 1003 and 1004. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 1011 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1011; a MAC/PHY split wherein RRC, PDCP, RLC, and MAC layers are operated by the CRAN/vBBUP and the PHY layer is operated by individual RAN nodes 1011; or a "lower PHY" split wherein RRC, PDCP, RLC, MAC layers and upper portions of the PHY layer are operated by the CRAN/vBBUP and lower portions of the PHY layer are operated by individual RAN nodes 1011. This virtualized framework allows the freed-up processor cores of the RAN nodes 1011 to perform other virtualized applications. In some implementations, an individual RAN node 1011 may represent individual gNB-DUs that are connected to a gNB-CU via individual F1 interfaces (not shown by FIG. 10). In these implementations, the gNB-DUs can include one or more remote radio heads or RFEMs (see, e.g., FIG. 11), and the gNB-CU may be operated by a server that is located in the RAN 1010 (not shown) or by a server pool in a similar manner as the CRAN/vBBUP. Additionally or alternatively, one or more of the RAN nodes 1011 may be next generation eNBs (ng-eNBs), which are RAN nodes that provide E-UTRA user plane and control plane protocol terminations toward the UEs 1001, and are connected to a 5GC via an NG interface.

In V2X scenarios one or more of the RAN nodes 1011 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1001 (vUEs 1001). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and can include a network interface controller to provide a wired connection (e.g., Ethernet) to a traffic signal controller and/or a backhaul network.

Any of the RAN nodes 1011 can terminate the air interface protocol and can be the first point of contact for the UEs 1001. In some implementations, any of the RAN nodes 1011 can fulfill various logical functions for the RAN 1010 including, but not limited to, radio network controller (RNC) functions such as radio bearer management, uplink and downlink dynamic radio resource management and data packet scheduling, and mobility management.

In some implementations, the UEs 1001 can be configured to communicate using OFDM communication signals with each other or with any of the RAN nodes 1011 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some implementations, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 3.8 GHz, whereas the unlicensed spectrum can include the 5 GHz band.

The RAN nodes 1011 may be configured to communicate with one another via interface 1012. In some implementations where the system 1000 is an LTE system (e.g., when CN 1020 is an EPC), the interface 1012 may be an X2 interface 1012. The X2 interface may be defined between two or more RAN nodes 1011 (e.g., two or more eNBs and the like) that connect to EPC 1020, and/or between two eNBs connecting to EPC 1020. In some implementations, the X2 interface can include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1001 from an SeNB for user data; information of PDCP PDUs that were not delivered to a UE 1001; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In some implementations, the system 1000 is a 5G or NR system, and the interface 1012 may be an Xn interface 1012. The Xn interface is defined between two or more RAN nodes 1011 (e.g., two or more gNBs and the like) that connect to 5GC 1020, between a RAN node 1011 (e.g., a gNB) connecting to 5GC 1020 and an eNB, and/or between two eNBs connecting to 5GC 1020. In some implementations, the Xn interface can include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support can include context transfer from an old (source) serving RAN node 1011 to new (target) serving RAN node 1011; and control of user plane tunnels between old (source) serving RAN node 1011 to new (target) serving RAN node 1011. A protocol stack of the Xn-U can include a transport network layer built on Internet Protocol (IP) transport layer, and a GTP-U layer on top of a UDP and/or IP layer(s) to carry user plane PDUs. The Xn-C protocol stack can include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1010 is shown to be communicatively coupled to a core network (CN) 1020. The CN 1020 can include a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 1020 may be referred to as a network slice, and a logical instantiation of a portion of the CN 1020 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In some implementations, the CN 1020 may be a 5GC (referred to as "5GC 1020" or the like), and the RAN 1010 may be connected with the CN 1020 via an NG interface 1013. In some implementations, the NG interface 1013 may be split into two parts, an NG user plane (NG-U) interface 1014, which carries traffic data between the RAN nodes 1011 and a UPF, and the S1 control plane (NG-C) interface 1015, which is a signaling interface between the RAN nodes 1011 and one or more AMFs (Access and Mobility Management Functions).

In some implementations, the CN 1020 may be a 5G CN (referred to as "5GC 1020" or the like). In some implementations, the CN 1020 may be an EPC. Where CN 1020 is an EPC (referred to as "EPC 1020" or the like), the RAN 1010 may be connected with the CN 1020 via an S1 interface 1013. In some implementations, the S1 interface 1013 may be split into two parts, an S1 user plane (S1-U) interface 1014, which carries traffic data between the RAN nodes 1011 and the S-GW, and the S1-MME interface 1015, which is a signaling interface between the RAN nodes 1011 and MMEs.

Figure 11:
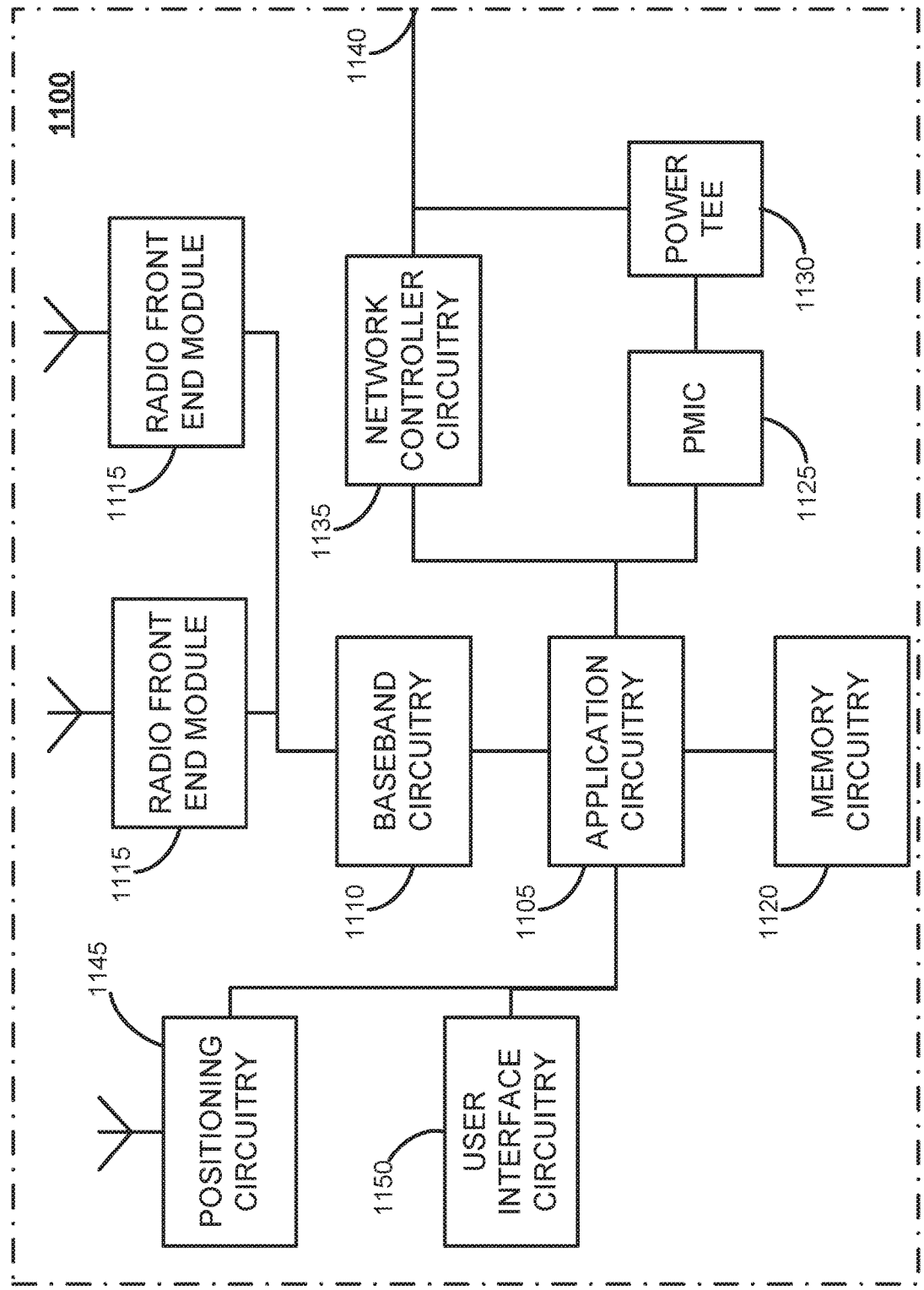
FIG. 11 illustrates an example of infrastructure equipment.

FIG. 11 illustrates an example of infrastructure equipment 1100. The infrastructure equipment 1100 (or "system 1100") may be implemented as a base station, radio head, RAN node such as the RAN nodes 1011 and/or AP 1006 shown and described previously, application server(s) 1030, and/or any other element/device discussed herein. In other examples, the system 1100 could be implemented in or by a UE.

The system 1100 includes application circuitry 1105, baseband circuitry 1110, one or more radio front end modules (RFEMs) 1115, memory circuitry 1120, power management integrated circuitry (PMIC) 1125, power tee circuitry 1130, network controller circuitry 1135, network interface connector 1140, satellite positioning circuitry 1145, and user interface circuitry 1150. In some implementations, the device 1100 can include additional elements such as, for example, memory/storage, display, camera, sensor, or input/output (I/O) interface. In some implementations, the components described below may be included in more than one device. For example, said circuitries may be separately included in more than one device for CRAN, vBBU, or other like implementations.

Application circuitry 1105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD), MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1105 may be coupled with or can include memory/storage elements and may be configured to execute instructions stored in the memory/storage to enable various applications or operating systems to run on the system 1100. In some implementations, the memory/storage elements may be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1105 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some implementations, the application circuitry 1105 can include, or may be, a special-purpose processor/controller to operate according to the various embodiments herein. As examples, the processor(s) of application circuitry 1105 can include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some implementations, the system 1100 may not utilize application circuitry 1105, and instead can include a special-purpose processor/controller to process IP data received from an EPC or 5GC, for example.

In some implementations, the application circuitry 1105 can include one or more hardware accelerators, which may be microprocessors, programmable processing devices, or the like. The one or more hardware accelerators can include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1105 can include logic blocks or logic fabric, and other interconnected resources that may be programmed to perform various functions, such as the procedures, methods, functions, etc. of the various embodiments discussed herein. In such embodiments, the circuitry of application circuitry 1105 can include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed with regard to FIG. 13.

User interface circuitry 1150 can include one or more user interfaces designed to enable user interaction with the system 1100 or peripheral component interfaces designed to enable peripheral component interaction with the system 1100. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The radio front end modules (RFEMs) 1115 can include a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see e.g., antenna array 13111 of FIG. 13 infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 can include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1120 may be implemented as one or more of solder down packaged integrated circuits, socketed memory modules and plug-in memory cards.

The PMIC 1125 can include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1130 may provide for electrical power drawn from a network cable to provide both power supply and data connectivity to the infrastructure equipment 1100 using a single cable.

The network controller circuitry 1135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1100 via network interface connector 1140 using a physical connection, which may be electrical (commonly referred to as a "copper interconnect"), optical, or wireless. The network controller circuitry 1135 can include one or more dedicated processors and/or FPGAs to communicate using one or more of the aforementioned protocols. In some implementations, the network controller circuitry 1135 can include multiple controllers to provide connectivity to other networks using the same or different protocols.

The positioning circuitry 1145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 1145 can include a Micro-Technology for Positioning, Navigation, and Timing (Micro-PNT) IC that uses a master timing clock to perform position tracking/estimation without GNSS assistance. The positioning circuitry 1145 may also be part of, or interact with, the baseband circuitry 1110 and/or RFEMs 1115 to communicate with the nodes and components of the positioning network. The positioning circuitry 1145 may also provide position data and/or time data to the application circuitry 1105, which may use the data to synchronize operations with various infrastructure (e.g., RAN nodes 1011, etc.), or the like.

The components shown by FIG. 11 may communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 12:
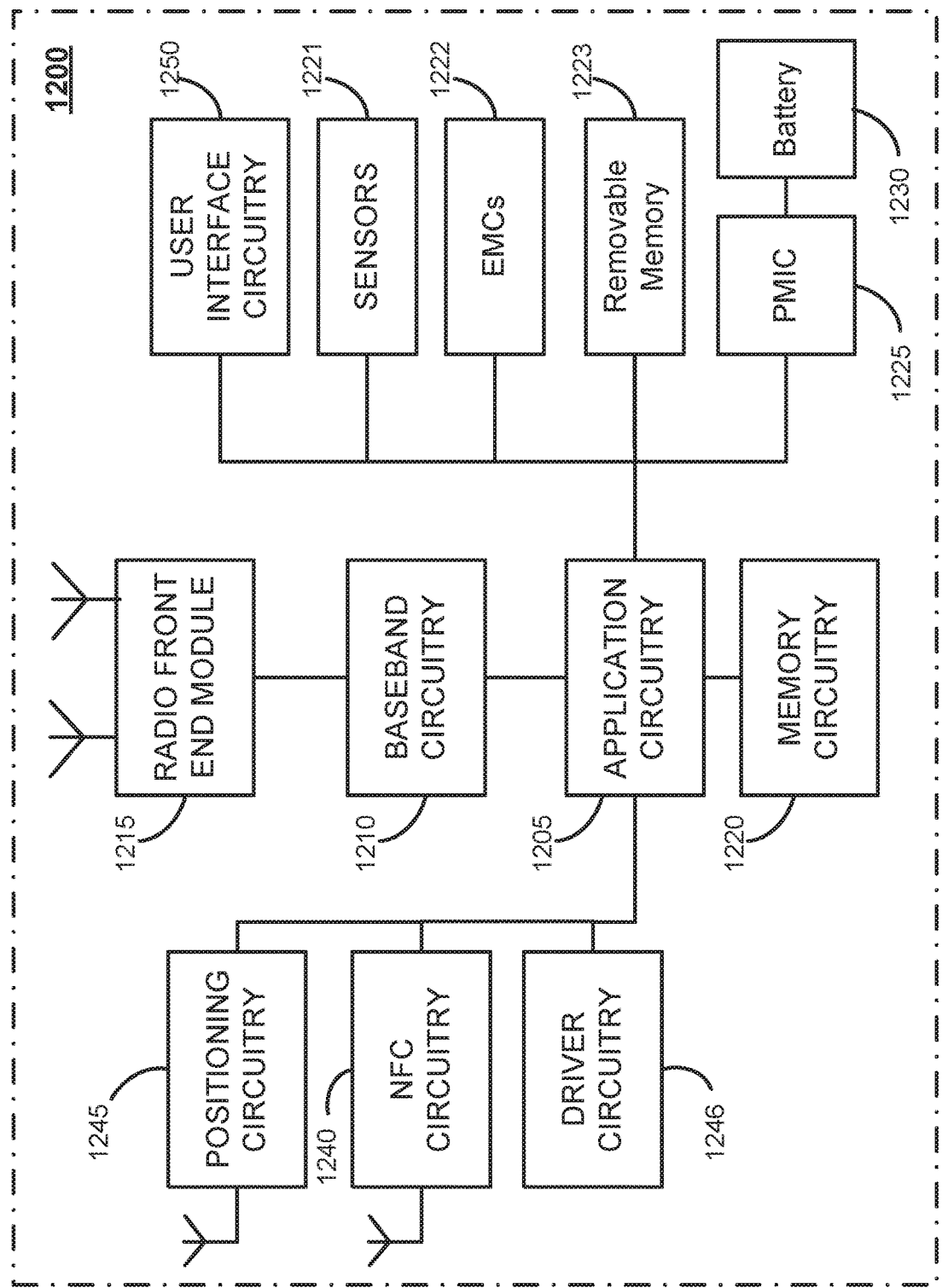
FIG. 12 illustrates an example of a computer platform.

FIG. 12 illustrates an example of a computer platform 1200 (or "device 1200"). In some implementations, the computer platform 1200 may be suitable for use as UEs 1001, application servers 1030, and/or any other element/device discussed herein. The platform 1200 can include any combinations of the components shown in the example. The components of platform 1200 may be implemented as integrated circuits (ICs), portions thereof, discrete electronic devices, or other modules, logic, hardware, software, firmware, or a combination thereof adapted in the computer platform 1200, or as components otherwise incorporated within a chassis of a larger system. The block diagram of FIG. 12 is intended to show a high level view of components of the computer platform 1200. However, some of the components shown may be omitted, additional components may be present, and different arrangement of the components shown may occur in other implementations.

Application circuitry 1205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1205 may be coupled with or can include memory/storage elements and may be configured to execute instructions stored in the memory/storage to enable various applications or operating systems to run on the platform 1200. In some implementations, the memory/storage elements may be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1105 can include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 1105 can include, or may be, a special-purpose processor/controller to operate according to the various embodiments herein.

As examples, the processor(s) of application circuitry 1205 can include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 1205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1205 may be a part of a system on a chip (SoC) in which the application circuitry 1205 and other components are formed into a single integrated circuit, or a single package, such as the Edison™ or Galileo™ SoC boards from Intel® Corporation.

Additionally or alternatively, application circuitry 1205 can include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1205 can include logic blocks or logic fabric, and other interconnected resources that may be programmed to perform various functions, such as the procedures, methods, functions, etc. of the various embodiments discussed herein. In such embodiments, the circuitry of application circuitry 1205 can include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1210 are discussed infra with regard to FIG. 13.

The RFEMs 1215 can include a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see e.g., antenna array 13111 of FIG. 13 infra), and the RFEM may be connected to multiple antennas. In alternative implementations, both mmWave and sub-mmWave radio functions may be implemented in the same physical RFEM 1215, which incorporates both mmWave antennas and sub-mmWave.

The memory circuitry 1220 can include any number and type of memory devices used to provide for a given amount of system memory. As examples, the memory circuitry 1220 can include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1220 may be developed in accordance with a Joint Electron Devices Engineering Council (JEDEC) low power double data rate (LPDDR)-based design, such as LPDDR2, LPDDR3, LPDDR4, or the like. Memory circuitry 1220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1220 may be on-die memory or registers associated with the application circuitry 1205. To provide for persistent storage of information such as data, applications, operating systems and so forth, memory circuitry 1220 can include one or more mass storage devices, which can include, inter alia, a solid state disk drive (SSDD), hard disk drive (HDD), a micro HDD, resistance change memories, phase change memories, holographic memories, or chemical memories, among others. For example, the computer platform 1200 may incorporate the three-dimensional (3D) cross-point (XPOINT) memories from Intel® and Micron®.

Removable memory circuitry 1223 can include devices, circuitry, enclosures/housings, ports or receptacles, etc. used to couple portable data storage devices with the platform 1200. These portable data storage devices may be used for mass storage purposes, and can include, for example, flash memory cards (e.g., Secure Digital (SD) cards, microSD cards, xD picture cards, and the like), and USB flash drives, optical discs, external HDDs, and the like.

The platform 1200 may also include interface circuitry (not shown) that is used to connect external devices with the platform 1200. The external devices connected to the platform 1200 via the interface circuitry include sensor circuitry 1221 and electro-mechanical components (EMCs) 1222, as well as removable memory devices coupled to removable memory circuitry 1223.

The sensor circuitry 1221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1222 include devices, modules, or subsystems whose purpose is to enable platform 1200 to change its state, position, and/or orientation, or move or control a mechanism or (sub)system. Additionally, EMCs 1222 may be configured to generate and send messages/signalling to other components of the platform 1200 to indicate a current state of the EMCs 1222. Examples of the EMCs 1222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In some implementations, platform 1200 is configured to operate one or more EMCs 1222 based on one or more captured events and/or instructions or control signals received from a service provider and/or various clients.

In some implementations, the interface circuitry may connect the platform 1200 with positioning circuitry 1245. The positioning circuitry 1245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 1245 can include a Micro-PNT IC that uses a master timing clock to perform position tracking/estimation without GNSS assistance. The positioning circuitry 1245 may also be part of, or interact with, the baseband circuitry 1110 and/or RFEMs 1215 to communicate with the nodes and components of the positioning network. The positioning circuitry 1245 may also provide position data and/or time data to the application circuitry 1205, which may use the data to synchronize operations with various infrastructure (e.g., radio base stations), for turn-by-turn navigation applications, or the like In some implementations, the interface circuitry may connect the platform 1200 with Near-Field Communication (NFC) circuitry 1240. NFC circuitry 1240 is configured to provide contactless, short-range communications based on radio frequency identification (RFID) standards, wherein magnetic field induction is used to enable communication between NFC circuitry 1240 and NFC-enabled devices external to the platform 1200 (e.g., an "NFC touchpoint"). NFC circuitry 1240 comprises an NFC controller coupled with an antenna element and a processor coupled with the NFC controller. The NFC controller may be a chip/IC providing NFC functionalities to the NFC circuitry 1240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1240, or initiate data transfer between the NFC circuitry 1240 and another active NFC device (e.g., a smartphone or an NFC-enabled POS terminal) that is proximate to the platform 1200.

The driver circuitry 1246 can include software and hardware elements that operate to control particular devices that are embedded in the platform 1200, attached to the platform 1200, or otherwise communicatively coupled with the platform 1200. The driver circuitry 1246 can include individual drivers allowing other components of the platform 1200 to interact with or control various input/output (I/O) devices that may be present within, or connected to, the platform 1200. For example, driver circuitry 1246 can include a display driver to control and allow access to a display device, a touchscreen driver to control and allow access to a touchscreen interface of the platform 1200, sensor drivers to obtain sensor readings of sensor circuitry 1221 and control and allow access to sensor circuitry 1221, EMC drivers to obtain actuator positions of the EMCs 1222 and/or control and allow access to the EMCs 1222, a camera driver to control and allow access to an embedded image capture device, audio drivers to control and allow access to one or more audio devices.

The power management integrated circuitry (PMIC) 1225 (also referred to as "power management circuitry 1225") may manage power provided to various components of the platform 1200. In particular, with respect to the baseband circuitry 1210, the PMIC 1225 may control power-source selection, voltage scaling, battery charging, or DC-to-DC conversion. The PMIC 1225 may often be included when the platform 1200 is capable of being powered by a battery 1230, for example, when the device is included in a UE 100.

In some implementations, the PMIC 1225 may control, or otherwise be part of, various power saving mechanisms of the platform 1200. For example, if the platform 1200 is in an RRC_Connected state, where it is still connected to the RAN node as it expects to receive traffic shortly, then it may enter a state known as Discontinuous Reception Mode (DRX) after a period of inactivity. During this state, the platform 1200 may power down for brief intervals of time and thus save power. If there is no data traffic activity for an extended period of time, then the platform 1200 may transition off to an RRC_Idle state, where it disconnects from the network and does not perform operations such as channel quality feedback, handover, etc. The platform 1200 goes into a very low power state and it performs paging where again it periodically wakes up to listen to the network and then powers down again. The platform 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1230 may power the platform 1200, although in some examples the platform 1200 may be mounted deployed in a fixed location, and may have a power supply coupled to an electrical grid. The battery 1230 may be a lithium ion battery, a metal-air battery, such as a zinc-air battery, an aluminum-air battery, a lithium-air battery, and the like. In some implementations, such as in V2X applications, the battery 1230 may be a typical lead-acid automotive battery.

In some implementations, the battery 1230 may be a "smart battery," which includes or is coupled with a Battery Management System (BMS) or battery monitoring integrated circuitry. The BMS may be included in the platform 1200 to track the state of charge (SoCh) of the battery 1230. The BMS may be used to monitor other parameters of the battery 1230 to provide failure predictions, such as the state of health (SoH) and the state of function (SoF) of the battery 1230. The BMS may communicate the information of the battery 1230 to the application circuitry 1205 or other components of the platform 1200. The BMS may also include an analog-to-digital (ADC) convertor that allows the application circuitry 1205 to directly monitor the voltage of the battery 1230 or the current flow from the battery 1230. The battery parameters may be used to determine actions that the platform 1200 may perform, such as transmission frequency, network operation, sensing frequency, and the like.

A power block, or other power supply coupled to an electrical grid may be coupled with the BMS to charge the battery 1230. In some examples, the power block may be replaced with a wireless power receiver to obtain the power wirelessly, for example, through a loop antenna in the computer platform 1200. In these examples, a wireless battery charging circuit may be included in the BMS. The specific charging circuits chosen may depend on the size of the battery 1230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1250 includes various input/output (I/O) devices present within, or connected to, the platform 1200, and includes one or more user interfaces designed to enable user interaction with the platform 1200 and/or peripheral component interfaces designed to enable peripheral component interaction with the platform 1200. The user interface circuitry 1250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry can include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1200. The output device circuitry may also include speakers or other audio emitting devices, printer(s), and/or the like. In some implementations, the sensor circuitry 1221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces can include, but are not limited to, a non-volatile memory port, a USB port, an audio jack, a power supply interface, etc.

Although not shown, the components of platform 1200 may communicate with one another using a suitable bus or interconnect (IX) technology, which can include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 13:
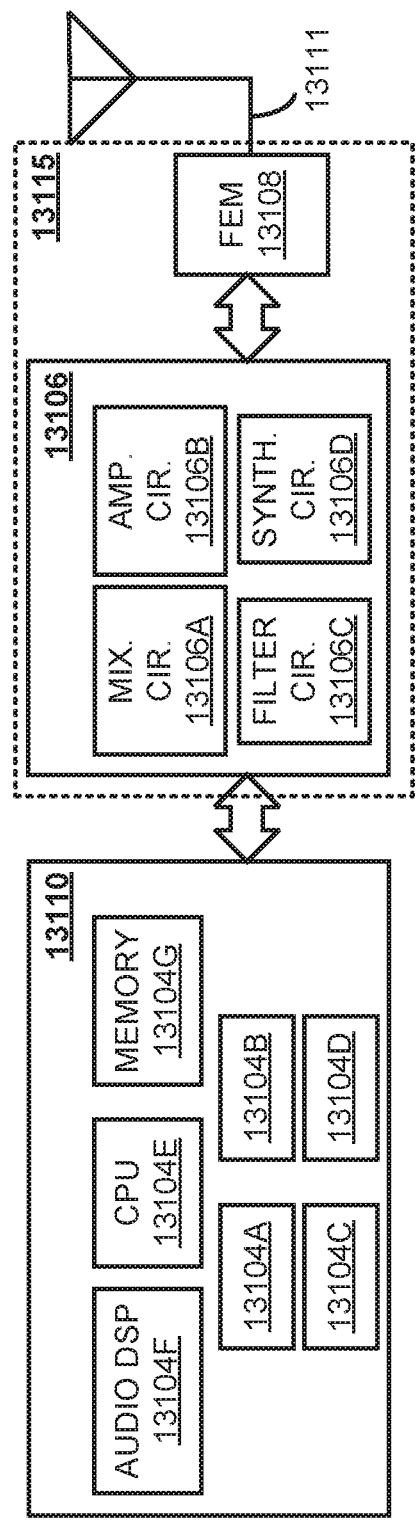
FIG. 13 illustrates example components of baseband circuitry and radio front end modules.

FIG. 13 illustrates example components of baseband circuitry 13110 and radio front end modules (RFEM) 13115. The baseband circuitry 13110 corresponds to the baseband circuitry 1110 and 1210 of FIGS. 11 and 12, respectively. The RFEM 13115 corresponds to the RFEM 1115 and 1215 of FIGS. 11 and 12, respectively. As shown, the RFEMs 13115 can include Radio Frequency (RF) circuitry 13106, front-end module (FEM) circuitry 13108, antenna array 13111 coupled together at least as shown.

The baseband circuitry 13110 includes circuitry and/or control logic configured to carry out various radio/network protocol and radio control functions that enable communication with one or more radio networks via the RF circuitry 13106. The radio control functions can include, but are not limited to, signal modulation/demodulation, encoding/decoding, radio frequency shifting, etc. In some implementations, modulation/demodulation circuitry of the baseband circuitry 13110 can include Fast-Fourier Transform (FFT), precoding, or constellation mapping/demapping functionality. In some implementations, encoding/decoding circuitry of the baseband circuitry 13110 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in some implementations. The baseband circuitry 13110 is configured to process baseband signals received from a receive signal path of the RF circuitry 13106 and to generate baseband signals for a transmit signal path of the RF circuitry 13106. The baseband circuitry 13110 is configured to interface with application circuitry 1105/1205 (see FIGS. 11 and 12) for generation and processing of the baseband signals and for controlling operations of the RF circuitry 13106. The baseband circuitry 13110 may handle various radio control functions.

The aforementioned circuitry and/or control logic of the baseband circuitry 13110 can include one or more single or multi-core processors. For example, the one or more processors can include a 3G baseband processor 13104A, a 4G/LTE baseband processor 13104B, a 5G/NR baseband processor 13104C, or some other baseband processor(s) 13104D for other existing generations, generations in development or to be developed in the future (e.g., sixth generation (6G), etc.). In some implementations, some or all of the functionality of baseband processors 13104A-D may be included in modules stored in the memory 13104G and executed via a Central Processing Unit (CPU) 13104E. In some implementations, some or all of the functionality of baseband processors 13104A-D may be provided as hardware accelerators (e.g., FPGAs, ASICs, etc.) loaded with the appropriate bit streams or logic blocks stored in respective memory cells. In various embodiments, the memory 13104G may store program code of a real-time OS (RTOS), which when executed by the CPU 13104E (or other baseband processor), is to cause the CPU 13104E (or other baseband processor) to manage resources of the baseband circuitry 13110, schedule tasks, etc. Examples of the RTOS can include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 13110 includes one or more audio digital signal processor(s) (DSP) 13104F. The audio DSP(s) 13104F include elements for compression/decompression and echo cancellation and can include other suitable processing elements in some implementations.

In some implementations, each of the processors 13104A-13104E include respective memory interfaces to send/receive data to/from the memory 13104G. The baseband circuitry 13110 may further include one or more interfaces to communicatively couple to other circuitries/devices, such as an interface to send/receive data to/from memory external to the baseband circuitry 13110; an application circuitry interface to send/receive data to/from the application circuitry 1105/1205 of FIGS. 11-13); an RF circuitry interface to send/receive data to/from RF circuitry 13106 of FIG. 13; a wireless hardware connectivity interface to send/receive data to/from one or more wireless hardware elements (e.g., Near Field Communication (NFC) components, Bluetooth®/Bluetooth® Low Energy components, Wi-Fi components, and/or the like); and a power management interface to send/receive power or control signals to/from the PMIC 1225.

In some implementations, baseband circuitry 13110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems can include a bus system, point-to-point connections, network-on-chip (NOC) structures, and/or some other suitable bus or interconnect technology, such as those discussed herein. The audio subsystem can include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 13110 can include protocol processing circuitry with one or more instances of control circuitry (not shown) to provide control functions for the digital baseband circuitry and/or radio frequency circuitry (e.g., the radio front end modules 13115).

In some implementations, the baseband circuitry 13110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 13110 and/or RF circuitry 13106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 13110 and/or RF circuitry 13106 are part of a Wi-Fi communication system. In the second example, the protocol processing circuitry would operate Wi-Fi MAC and logical link control (LLC) functions. The protocol processing circuitry can include one or more memory structures (e.g., 13104G) to store program code and data for operating the protocol functions, as well as one or more processing cores to execute the program code and perform various operations using the data. The baseband circuitry 13110 may also support radio communications for more than one wireless protocol.

The various hardware elements of the baseband circuitry 13110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 13110 may be suitably combined in a single chip or chipset, or disposed on a same circuit board. In another example, some or all of the constituent components of the baseband circuitry 13110 and RF circuitry 13106 may be implemented together such as, for example, a system on a chip (SoC) or System-in-Package (SiP). In another example, some or all of the constituent components of the baseband circuitry 13110 may be implemented as a separate SoC that is communicatively coupled with and RF circuitry 13106 (or multiple instances of RF circuitry 13106). In yet another example, some or all of the constituent components of the baseband circuitry 13110 and the application circuitry 1105/1205 may be implemented together as individual SoCs mounted to a same circuit board (e.g., a "multi-chip package").

In some implementations, the baseband circuitry 13110 may provide for communication compatible with one or more radio technologies. For example, in some embodiments, the baseband circuitry 13110 may support communication with an E-UTRAN or other WMAN, a WLAN, a WPAN. Embodiments in which the baseband circuitry 13110 is configured to support radio communications of more than one wireless protocol may be referred to as multi-mode baseband circuitry.

RF circuitry 13106 may enable communication with wireless networks using modulated electromagnetic radiation through a non-solid medium. In various embodiments, the RF circuitry 13106 can include switches, filters, amplifiers, etc. to facilitate the communication with the wireless network. RF circuitry 13106 can include a receive signal path, which can include circuitry to down-convert RF signals received from the FEM circuitry 13108 and provide baseband signals to the baseband circuitry 13110. RF circuitry 13106 may also include a transmit signal path, which can include circuitry to up-convert baseband signals provided by the baseband circuitry 13110 and provide RF output signals to the FEM circuitry 13108 for transmission.

In some implementations, the receive signal path of the RF circuitry 13106 can include mixer circuitry 13106a, amplifier circuitry 13106b and filter circuitry 13106c. In some implementations, the transmit signal path of the RF circuitry 13106 can include filter circuitry 13106c and mixer circuitry 13106a. RF circuitry 13106 may also include synthesizer circuitry 13106d for synthesizing a frequency for use by the mixer circuitry 13106a of the receive signal path and the transmit signal path. In some implementations, the mixer circuitry 13106a of the receive signal path may be configured to down-convert RF signals received from the FEM circuitry 13108 based on the synthesized frequency provided by synthesizer circuitry 13106d. The amplifier circuitry 13106b may be configured to amplify the down-converted signals and the filter circuitry 13106c may be a low-pass filter (LPF) or band-pass filter (BPF) configured to remove unwanted signals from the down-converted signals to generate output baseband signals. Output baseband signals may be provided to the baseband circuitry 13110 for further processing. In some implementations, the output baseband signals may be zero-frequency baseband signals, although this is not a requirement. In some implementations, mixer circuitry 13106a of the receive signal path can include passive mixers, although the scope of the embodiments is not limited in this respect.

In some implementations, the mixer circuitry 13106a of the transmit signal path may be configured to up-convert input baseband signals based on the synthesized frequency provided by the synthesizer circuitry 13106d to generate RF output signals for the FEM circuitry 13108. The baseband signals may be provided by the baseband circuitry 13110 and may be filtered by filter circuitry 13106c.

In some implementations, the mixer circuitry 13106a of the receive signal path and the mixer circuitry 13106a of the transmit signal path can include two or more mixers and may be arranged for quadrature downconversion and upconversion, respectively. In some implementations, the mixer circuitry 13106a of the receive signal path and the mixer circuitry 13106a of the transmit signal path can include two or more mixers and may be arranged for image rejection (e.g., Hartley image rejection). In some implementations, the mixer circuitry 13106a of the receive signal path and the mixer circuitry 13106a of the transmit signal path may be arranged for direct downconversion and direct upconversion, respectively. In some implementations, the mixer circuitry 13106a of the receive signal path and the mixer circuitry 13106a of the transmit signal path may be configured for super-heterodyne operation.

In some implementations, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 13106 can include analog-to-digital converter (ADC) and digital-to-analog converter (DAC) circuitry and the baseband circuitry 13110 can include a digital baseband interface to communicate with the RF circuitry 13106. In some dual-mode embodiments, a separate radio IC circuitry may be provided for processing signals for each spectrum, although the scope of the embodiments is not limited in this respect. In some implementations, the synthesizer circuitry 13106d may be a fractional-N synthesizer or a fractional N/N+1 synthesizer, although the scope of the embodiments is not limited in this respect as other types of frequency synthesizers may be suitable. For example, synthesizer circuitry 13106*d* may be a delta-sigma synthesizer, a frequency multiplier, or a synthesizer comprising a phase-locked loop with a frequency divider. The synthesizer circuitry 13106*d* may be configured to synthesize an output frequency for use by the mixer circuitry 13106*a* of the RF circuitry 13106 based on a frequency input and a divider control input. In some implementations, the synthesizer circuitry 13106*d* may be a fractional N/N+1 synthesizer. In some implementations, frequency input may be provided by a voltage controlled oscillator (VCO), although that is not a requirement. Divider control input may be provided by either the baseband circuitry 13110 or the application circuitry 1105/1205 depending on the desired output frequency. In some implementations, a divider control input (e.g., N) may be determined from a look-up table based on a channel indicated by the application circuitry 1105/1205.

Synthesizer circuitry 13106*d* of the RF circuitry 13106 can include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 13106*d* may be configured to generate a carrier frequency as the output frequency, while in some implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 13106 can include an IQ/polar converter.

FEM circuitry 13108 can include a receive signal path, which can include circuitry configured to operate on RF signals received from antenna array 13111, amplify the received signals and provide the amplified versions of the received signals to the RF circuitry 13106 for further processing. FEM circuitry 13108 may also include a transmit signal path, which can include circuitry configured to amplify signals for transmission provided by the RF circuitry 13106 for transmission by one or more of antenna elements of antenna array 13111. In various embodiments, the amplification through the transmit or receive signal paths may be done solely in the RF circuitry 13106, solely in the FEM circuitry 13108, or in both the RF circuitry 13106 and the FEM circuitry 13108.

In some implementations, the FEM circuitry 13108 can include a TX/RX switch to switch between transmit mode and receive mode operation. The FEM circuitry 13108 can include a receive signal path and a transmit signal path. The receive signal path of the FEM circuitry 13108 can include an LNA to amplify received RF signals and provide the amplified received RF signals as an output (e.g., to the RF circuitry 13106). The transmit signal path of the FEM circuitry 13108 can include a power amplifier (PA) to amplify input RF signals (e.g., provided by RF circuitry 13106), and one or more filters to generate RF signals for subsequent transmission by one or more antenna elements of the antenna array 13111.

The antenna array 13111 comprises one or more antenna elements, each of which is configured convert electrical signals into radio waves to travel through the air and to convert received radio waves into electrical signals. For example, digital baseband signals provided by the baseband circuitry 13110 is converted into analog RF signals (e.g., modulated waveform) that will be amplified and transmitted via the antenna elements of the antenna array 13111 including one or more antenna elements (not shown). The antenna elements may be omnidirectional, direction, or a combination thereof. The antenna elements may be formed in a multitude of arranges as are known and/or discussed herein. The antenna array 13111 can include microstrip antennas or printed antennas that are fabricated on the surface of one or more printed circuit boards. The antenna array 13111 may be formed in as a patch of metal foil (e.g., a patch antenna) in a variety of shapes, and may be coupled with the RF circuitry 13106 and/or FEM circuitry 13108 using metal transmission lines or the like.

Processors of the application circuitry 1105/1205 and processors of the baseband circuitry 13110 may be used to execute elements of one or more instances of a protocol stack. For example, processors of the baseband circuitry 13110, alone or in combination, may be used execute Layer 3, Layer 2, or Layer 1 functionality, while processors of the application circuitry 1105/1205 may utilize data (e.g., packet data) received from these layers and further execute Layer 4 functionality (e.g., TCP and UDP layers). As referred to herein, Layer 3 can include a RRC layer, described in further detail below. As referred to herein, Layer 2 can include a MAC layer, an RLC layer, and a PDCP layer, described in further detail below. As referred to herein, Layer 1 can include a PHY layer of a UE/RAN node, described in further detail below.

Figure 14:
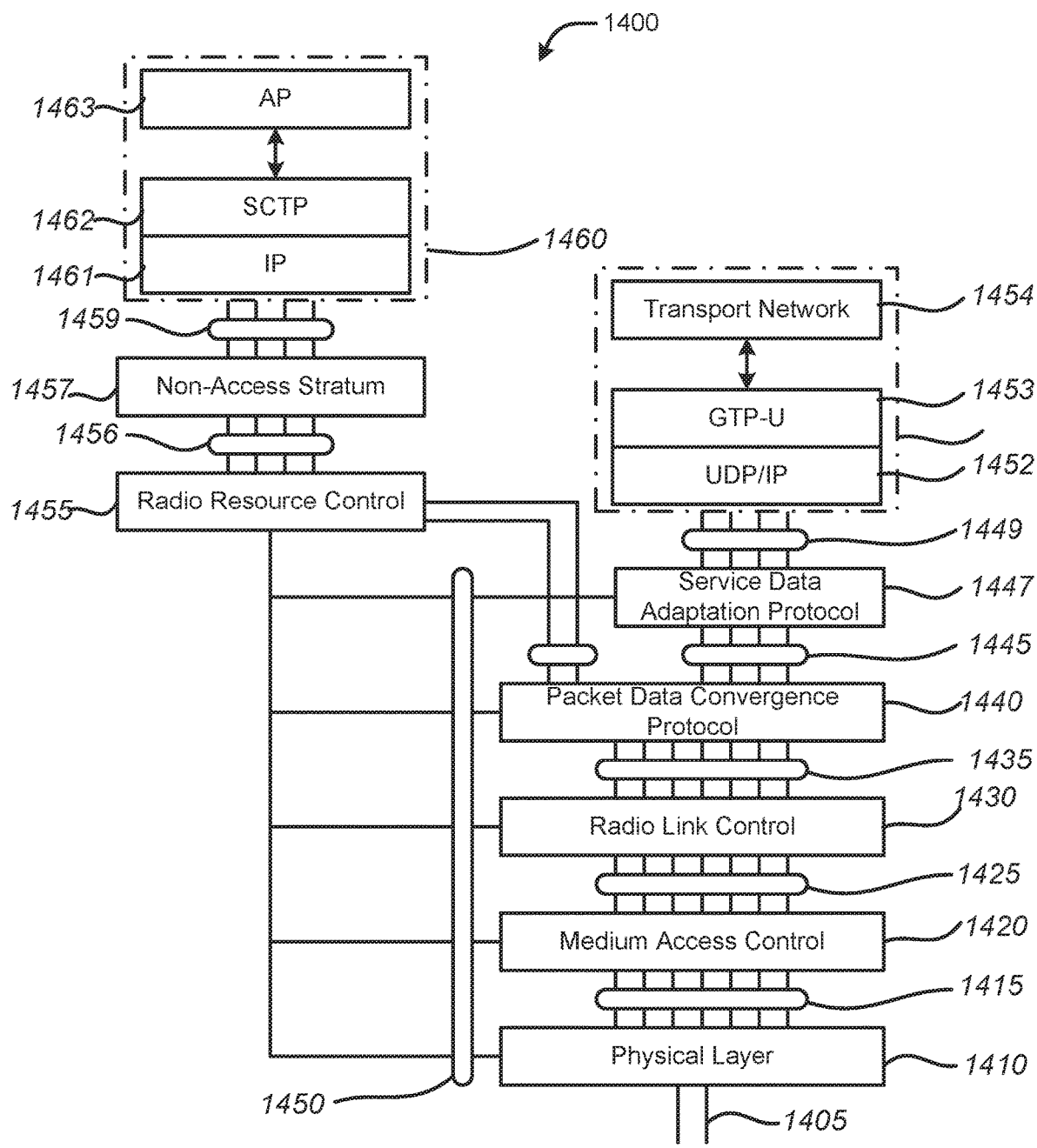
FIG. 14 illustrates various protocol functions that can be implemented in a wireless communication device.

FIG. 14 illustrates various protocol functions that can be implemented in a wireless communication device. In particular, FIG. 14 includes an arrangement 1400 showing interconnections between various protocol layers/entities. The following description of FIG. 14 is provided for various protocol layers/entities that operate in conjunction with the 5G/NR system standards and LTE system standards, but some or all of the aspects of FIG. 14 may be applicable to other wireless communication network systems as well.

The protocol layers of arrangement 1400 can include one or more of PHY 1410, MAC 1420, RLC 1430, PDCP 1440, SDAP 1447, RRC 1455, and NAS layer 1457, in addition to other higher layer functions not illustrated. The protocol layers can include one or more service access points (e.g., items 1459, 1456, 1450, 1449, 1445, 1435, 1425, and 1415 in FIG. 14) that may provide communication between two or more protocol layers.

The PHY 1410 may transmit and receive physical layer signals 1405 that may be received from or transmitted to one or more other communication devices. The physical layer signals 1405 can include one or more physical channels, such as those discussed herein. The PHY 1410 may further perform link adaptation or adaptive modulation and coding (AMC), power control, cell search (e.g., for initial synchronization and handover purposes), and other measurements used by higher layers, such as the RRC 1455. The PHY 1410 may still further perform error detection on the transport channels, forward error correction (FEC) coding/decoding of the transport channels, modulation/demodulation of physical channels, interleaving, rate matching, mapping onto physical channels, and MIMO antenna processing. In some implementations, an instance of PHY 1410 may process requests from and provide indications to an instance of MAC 1420 via one or more PHY-SAP 1415. According to some embodiments, requests and indications communicated via PHY-SAP 1415 can include one or more transport channels.

Instance(s) of MAC 1420 may process requests from, and provide indications to, an instance of RLC 1430 via one or more MAC-SAPs 1425. These requests and indications communicated via the MAC-SAP 1425 can include one or more logical channels. The MAC 1420 may perform mapping between the logical channels and transport channels, multiplexing of MAC SDUs from one or more logical channels onto TBs to be delivered to PHY 1410 via the transport channels, de-multiplexing MAC SDUs to one or more logical channels from TBs delivered from the PHY 1410 via transport channels, multiplexing MAC SDUs onto TBs, scheduling information reporting, error correction through HARQ, and logical channel prioritization.

Instance(s) of RLC 1430 may process requests from and provide indications to an instance of PDCP 1440 via one or more radio link control service access points (RLC-SAP) 1435. These requests and indications communicated via RLC-SAP 1435 can include one or more RLC channels. The RLC 1430 may operate in a plurality of modes of operation, including: Transparent Mode™, Unacknowledged Mode (UM), and Acknowledged Mode (AM). The RLC 1430 may execute transfer of upper layer protocol data units (PDUs), error correction through automatic repeat request (ARQ) for AM data transfers, and concatenation, segmentation and reassembly of RLC SDUs for UM and AM data transfers. The RLC 1430 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1440 may process requests from and provide indications to instance(s) of RRC 1455 and/or instance(s) of SDAP 1447 via one or more packet data convergence protocol service access points (PDCP-SAP) 1445. These requests and indications communicated via PDCP-SAP 1445 can include one or more radio bearers. The PDCP 1440 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1447 may process requests from and provide indications to one or more higher layer protocol entities via one or more SDAP-SAP 1449. These requests and indications communicated via SDAP-SAP 1449 can include one or more QoS flows. The SDAP 1447 may map QoS flows to DRBs, and vice versa, and may also mark QFIs in DL and UL packets. A single SDAP entity 1447 may be configured for an individual PDU session. In the UL direction, the NG-RAN 1010 may control the mapping of QoS Flows to DRB(s) in two different ways, reflective mapping or explicit mapping. For reflective mapping, the SDAP 1447 of a UE 1001 may monitor the QFIs of the DL packets for each DRB, and may apply the same mapping for packets flowing in the UL direction. For a DRB, the SDAP 1447 of the UE 1001 may map the UL packets belonging to the QoS flows(s) corresponding to the QoS flow ID(s) and PDU session observed in the DL packets for that DRB.

The RRC 1455 may configure, via one or more management service access points (M-SAP), aspects of one or more protocol layers, which can include one or more instances of PHY 1410, MAC 1420, RLC 1430, PDCP 1440 and SDAP 1447. In some implementations, an instance of RRC 1455 may process requests from and provide indications to one or more NAS entities 1457 via one or more RRC-SAPs 1456. The main services and functions of the RRC 1455 can include broadcast of system information (e.g., included in MIBs or SIBs related to the NAS), broadcast of system information related to the access stratum (AS), paging, establishment, maintenance and release of an RRC connection between the UE 1001 and RAN 1010 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs can include one or more IEs, which may each comprise individual data fields or data structures.

The NAS 1457 may form the highest stratum of the control plane between the UE 1001 and the AMF. The NAS 1457 may support the mobility of the UEs 1001 and the session management procedures to establish and maintain IP connectivity between the UE 1001 and a P-GW in LTE systems. In some implementations, one or more protocol entities of arrangement 1400 may be implemented in UEs 1001, RAN nodes 1011, AMF in NR implementations or MME in LTE implementations, UPF in NR implementations or S-GW and P-GW in LTE implementations, or the like to be used for control plane or user plane communications protocol stack between the aforementioned devices. In such embodiments, one or more protocol entities that may be implemented in one or more of UE 1001, gNB 1011, AMF, etc. may communicate with a respective peer protocol entity that may be implemented in or on another device using the services of respective lower layer protocol entities to perform such communication. In some implementations, a gNB-CU of the gNB 1011 may host the RRC 1455, SDAP 1447, and PDCP 1440 of the gNB that controls the operation of one or more gNB-DUs, and the gNB-DUs of the gNB 1011 may each host the RLC 1430, MAC 1420, and PHY 1410 of the gNB 1011.

In a first example, a control plane protocol stack can include, in order from highest layer to lowest layer, NAS 1457, RRC 1455, PDCP 1440, RLC 1430, MAC 1420, and PHY 1410. In this example, upper layers 1460 may be built on top of the NAS 1457, which includes an IP layer 1461, an SCTP 1462, and an application layer signaling protocol (AP) 1463.

In NR implementations, the AP 1463 may be an NG application protocol layer (NGAP or NG-AP) 1463 for the NG interface 1013 defined between the NG-RAN node 1011 and the AMF, or the AP 1463 may be an Xn application protocol layer (XnAP or Xn-AP) 1463 for the Xn interface 1012 that is defined between two or more RAN nodes 1011. The NG-AP 1463 may support the functions of the NG interface 1013 and can include Elementary Procedures (EPs). An NG-AP EP may be a unit of interaction between the NG-RAN node 1011 and the AMF. The NG-AP 1463 services can include two groups: UE-associated services (e.g., services related to a UE 1001) and non-UE-associated services (e.g., services related to the whole NG interface instance between the NG-RAN node 1011 and AMF). These services can include functions including, but not limited to: a paging function for the sending of paging requests to NG-RAN nodes 1011 involved in a particular paging area; a UE context management function for allowing the AMF to establish, modify, and/or release a UE context in the AMF and the NG-RAN node 1011; a mobility function for UEs 1001 in ECM-CONNECTED mode for intra-system HOs to support mobility within NG-RAN and inter-system HOs to support mobility from/to EPS systems; a NAS Signaling Transport function for transporting or rerouting NAS messages between UE 1001 and AMF; a NAS node selection function for determining an association between the AMF and the UE 1001; NG interface management function(s) for setting up the NG interface and monitoring for errors over the NG interface; a warning message transmission function for providing means to transfer warning messages via NG interface or cancel ongoing broadcast of warning messages: a Configuration Transfer function for requesting and transferring of RAN configuration information (e.g., SON information, performance measurement (PM) data, etc.) between two RAN nodes 1011 via CN 1020; and/or other like functions.

The XnAP 1463 may support the functions of the Xn interface 1012 and can include XnAP basic mobility procedures and XnAP global procedures. The XnAP basic mobility procedures can include procedures used to handle UE mobility within the NG RAN 1011 (or E-UTRAN), such as handover preparation and cancellation procedures, SN Status Transfer procedures, UE context retrieval and UE context release procedures, RAN paging procedures, dual connectivity related procedures, and the like. The XnAP global procedures can include procedures that are not related to a specific UE 1001, such as Xn interface setup and reset procedures, NG-RAN update procedures, cell activation procedures, and the like.

In LTE implementations, the AP 1463 may be an S1 Application Protocol layer (S1-AP) 1463 for the S1 interface 1013 defined between an E-UTRAN node 1011 and an MME, or the AP 1463 may be an X2 application protocol layer (X2AP or X2-AP) 1463 for the X2 interface 1012 that is defined between two or more E-UTRAN nodes 1011.

The S1 Application Protocol layer (S1-AP) 1463 may support the functions of the S1 interface, and similar to the NG-AP discussed previously, the S1-AP can include S1-AP EPs. An S1-AP EP may be a unit of interaction between the E-UTRAN node 1011 and an MME within an LTE CN 1020. The S1-AP 1463 services can include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1463 may support the functions of the X2 interface 1012 and can include X2AP basic mobility procedures and X2AP global procedures. The X2AP basic mobility procedures can include procedures used to handle UE mobility within the E-UTRAN 1020, such as handover preparation and cancellation procedures, SN Status Transfer procedures, UE context retrieval and UE context release procedures, RAN paging procedures, dual connectivity related procedures, and the like. The X2AP global procedures can include procedures that are not related to a specific UE 1001, such as X2 interface setup and reset procedures, load indication procedures, error indication procedures, cell activation procedures, and the like.

The SCTP layer (alternatively referred to as the SCTP/IP layer) 1462 may provide guaranteed delivery of application layer messages (e.g., NGAP or XnAP messages in NR implementations, or S1-AP or X2AP messages in LTE implementations). The SCTP 1462 may ensure reliable delivery of signaling messages between the RAN node 1011 and the AMF/MME based, in part, on the IP protocol, supported by the IP 1461. The Internet Protocol layer (IP) 1461 may be used to perform packet addressing and routing functionality. In some implementations the IP layer 1461 may use point-to-point transmission to deliver and convey PDUs. In this regard, the RAN node 1011 can include L2 and L1 layer communication links (e.g., wired or wireless) with the MME/AMF to exchange information.

In a second example, a user plane protocol stack can include, in order from highest layer to lowest layer, SDAP 1447, PDCP 1440, RLC 1430, MAC 1420, and PHY 1410. The user plane protocol stack may be used for communication between the UE 1001, the RAN node 1011, and UPF in NR implementations or an S-GW and P-GW in LTE implementations. In this example, upper layers 1451 may be built on top of the SDAP 1447, and can include a user datagram protocol (UDP) and IP security layer (UDP/IP) 1452, a General Packet Radio Service (GPRS) Tunneling Protocol for the user plane layer (GTP-U) 1453, and a User Plane PDU layer (UP PDU) 1463.

The transport network layer 1454 (also referred to as a "transport layer") may be built on IP transport, and the GTP-U 1453 may be used on top of the UDP/IP layer 1452 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1453 may be used for carrying user data within the GPRS core network and between the radio access network and the core network. The user data transported can be packets in any of IPv4, IPv6, or PPP formats, for example. The UDP/IP 1452 may provide checksums for data integrity, port numbers for addressing different functions at the source and destination, and encryption and authentication on the selected data flows. The RAN node 1011 and the S-GW may utilize an S1-U interface to exchange user plane data via a protocol stack comprising an L1 layer (e.g., PHY 1410), an L2 layer (e.g., MAC 1420, RLC 1430, PDCP 1440, and/or SDAP 1447), the UDP/IP layer 1452, and the GTP-U 1453. The S-GW and the P-GW may utilize an S5/S8a interface to exchange user plane data via a protocol stack comprising an L1 layer, an L2 layer, the UDP/IP layer 1452, and the GTP-U 1453. As discussed previously, NAS protocols may support the mobility of the UE 1001 and the session management procedures to establish and maintain IP connectivity between the UE 1001 and the P-GW.

Moreover, although not shown by FIG. 14, an application layer may be present above the AP 1463 and/or the transport network layer 1454. The application layer may be a layer in which a user of the UE 1001, RAN node 1011, or other network element interacts with software applications being executed, for example, by application circuitry 1105 or application circuitry 1205, respectively. The application layer may also provide one or more interfaces for software applications to interact with communications systems of the UE 1001 or RAN node 1011, such as the baseband circuitry 13110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 15:
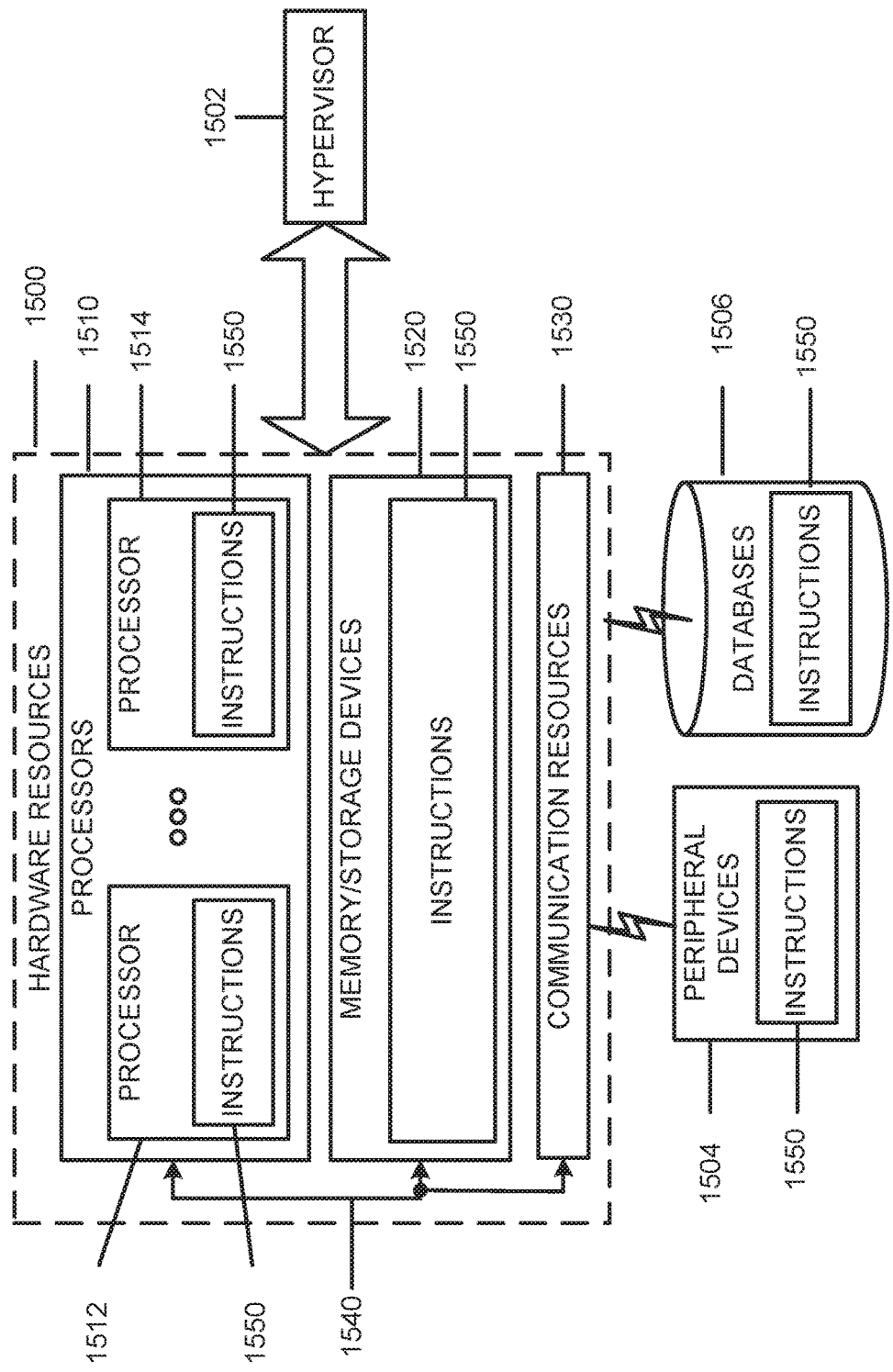
FIG. 15 illustrates a block diagram of example components able to read instructions from a machine-readable medium and perform one or more of the techniques described herein.

FIG. 15 illustrates a block diagram of example components able to read instructions from a machine-readable or computer-readable medium (e.g., a non-transitory machine-readable storage medium) and perform any one or more of the techniques described herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500.

The processors 1510 can include, for example, a processor 1512 and a processor 1514. The processor(s) 1510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1520 can include main memory, disk storage, or any suitable combination thereof. The memory/storage devices 1520 can include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1530 can include interconnection or network interface components or other suitable devices to communicate with one or more peripheral devices 1504 or one or more databases 1506 via a network 1508. For example, the communication resources 1530 can include wired communication components (e.g., for coupling via USB), cellular communication components, NFC components, Bluetooth® (or Bluetooth® Low Energy) components, Wi-Fi components, and other communication components.

Instructions 1550 can include software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, one or more ASICs or FPGAs.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The apparatus can also include one or more memory structures such as nonvolatile memory, volatile memory, or both.

As described above, some aspects of the subject matter of this specification include gathering and use of data available from various sources to improve services a wireless device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    determining, based on information collected from one or more network components associated with a cellular network, that an aerial device is communicating via the cellular network and is operating in a geographical area, the determining comprising:
        processing signals from a user equipment operating in the cellular network; and
        determining, based on said processing signals, that the user equipment is likely coupled with the aerial device;
    determining whether the aerial device corresponds to a remote identifier that is transmitted within the geographical area or reported for the geographical area, the determining comprising:
        comparing characteristics of the user equipment to one or more known remote identifiers in a corresponding geographical area to determine whether the user equipment is providing proper identification; and
    providing an alarm notification based on the aerial device lacking a correspondence to a remote identifier which is transmitted within the geographical area or reported for the geographical area.

2. The method of claim 1, comprising:
    receiving, from the aerial device, information that indicates at least one of a reported identity, a reported location, or a reported activity of the aerial device; and
    verifying the received information that indicates at least one of the reported identity, the reported location, or the reported activity of the aerial device based on corresponding information detected by the one or more network components or provided by an aerial device service supplier that indicates at least one of a detected identity, a detected location, or a detected activity of the aerial device.

3. The method of claim 2, wherein the received information comprises a reported remote identifier associated with the aerial device.

4. The method of claim 1, comprising:
monitoring remote identifier broadcasts in the geographical area;
performing an automated check for anomalous situations based on the monitoring of the remote identifier broadcasts in the geographical area;
detecting an anomalous situation based on the performing of the automated check; and
providing a notification to a registered recipient in response to a detection of the anomalous situation.

5. The method of claim 4, wherein performing the automated check comprises:
detecting, based on cellular network signaling, information related to the aerial device;
determining a reported remote identifier for the aerial device; and
detecting a discrepancy between the detected information and the reported remote identifier.

6. The method of claim 1, wherein determining whether the aerial device corresponds to a remote identifier that is transmitted within the geographical area or reported for the geographical area comprises:
receiving, from a plurality of devices, authentication messages based on public key encryption of corresponding remote identifiers and certificates;
based at least on the authentication messages, determining, for at least some of the plurality of devices, whether the authentication messages satisfy stored authentication data based on public key encryption of remote identifiers and the certificates and that the remote identifier broadcasts in the geographical area are likely authentic; and
determining that the aerial device does not correspond to a remote identifier that is transmitted within the geographical area or reported for the geographical area based at least on a respective remote identifier broadcast determined to not be authentic.

7. The method of claim 4, comprising:
aggregating data collected based on the monitoring, wherein aggregating data further comprises collecting aviation-band information including transponder traffic; and
providing a report based on the aggregation of the data.

8. An apparatus comprising one or more processors configured to perform operations comprising:
determining, based on information collected from one or more network components associated with a cellular network, that an aerial device is communicating via the cellular network and is operating in a geographical area, the determining comprising:
processing signals from a user equipment operating in the cellular network; and
determining, based on said processing signals, that the user equipment is likely coupled with the aerial device;
determining whether the aerial device corresponds to a remote identifier that is transmitted within the geographical area or reported for the geographical area, the determining comprising:
comparing characteristics of the user equipment to one or more known remote identifiers in a corresponding geographical area to determine whether the user equipment is providing proper identification; and
providing an alarm notification based on the aerial device lacking a correspondence to a remote identifier which is transmitted within the geographical area or reported for the geographical area.

9. The apparatus of claim 8, wherein the operations comprise:
receiving, from the aerial device, information that indicates an identity, a location, and an activity of the aerial device; and
verifying the received information based on information detected by the one or more network components or provided by an aerial device service supplier.

10. The apparatus of claim 9, wherein the received information comprises a remote identifier associated with the aerial device.

11. The apparatus of claim 8, wherein the operations comprise:
monitoring remote identifier broadcasts in the geographical area;
performing an automated check for anomalous situations based on the monitoring of the remote identifier broadcasts in the geographical area;
detecting an anomalous situation based on the performing of the automated check; and
providing a notification to a registered recipient in response to a detection of the anomalous situation.

12. The apparatus of claim 11, wherein performing the automated check comprises:
detecting, based on cellular network signaling, information related to the aerial device;
determining a reported remote identifier for the aerial device; and
detecting a discrepancy between the detected information and the reported remote identifier.

13. The apparatus of claim 8, wherein determining whether the aerial device corresponds to a remote identifier that is transmitted within the geographical area or reported for the geographical area comprises:
receiving, from a plurality of devices, authentication messages based on public key encryption of corresponding remote identifiers and certificates;
based at least on the authentication messages, determining, for at least some of the plurality of devices, whether the authentication messages satisfy stored authentication data based on public key encryption of remote identifiers and the certificates and that the remote identifier broadcasts in the geographical area are likely authentic; and
determining that the aerial device does not correspond to a remote identifier that is transmitted within the geographical area or reported for the geographical area based at least on a respective remote identifier broadcast determined to not be authentic.

14. The apparatus of claim 11, wherein the operations comprise:
aggregating data collected based on the monitoring, wherein aggregating data further comprises collecting aviation-band information including transponder traffic; and
providing a report based on the aggregation of the data.

15. An apparatus comprising one or more processors configured to perform operations comprising:

receiving one or more first remote identifiers that are being broadcasted in a geographical area;

receiving one or more second remote identifiers for the geographical area reported by an aerial device service supplier;

detecting one or more user devices in the geographical area that appear to be aerial, the detecting comprising:
   processing signals from a user equipment operating in a cellular network; and
   determining, based on said processing signals, that the user equipment is likely coupled with an aerial device;

identifying, from a set of one or more detected user devices, one or more suspect aerial devices that are not associated with the one or more first remote identifiers and the one or more second remote identifiers, the identifying comprising:
   comparing characteristics of the user equipment to one or more known remote identifiers in a corresponding geographical area to determine whether the user equipment is providing proper identification; and
   providing a notification comprising information regarding the one or more suspect aerial devices.

16. The apparatus of claim 15, wherein detecting one or more user devices in the geographical area that appear to be aerial comprises:
   determining one or more properties of the signals that indicate the user equipment is performing aerial operations.

17. The apparatus of claim 15, wherein the one or more suspect aerial devices comprises an aerial device that is determined to be noncompliant based on non-transmission of a remote identifier.

18. The apparatus of claim 15, wherein the one or more suspect aerial devices comprises an aerial device that is determined to be noncompliant based on transmitting false information.

* * * * *